(12) United States Patent
Yano et al.

(10) Patent No.: US 11,536,959 B2
(45) Date of Patent: Dec. 27, 2022

(54) IMAGE DISPLAY APPARATUS

(71) Applicant: SONY CORPORATION, Tokyo (JP)

(72) Inventors: Tomoya Yano, Tokyo (JP); Tomoharu Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/284,237

(22) PCT Filed: Oct. 2, 2019

(86) PCT No.: PCT/JP2019/038952
§ 371 (c)(1),
(2) Date: Apr. 9, 2021

(87) PCT Pub. No.: WO2020/080111
PCT Pub. Date: Apr. 23, 2020

(65) Prior Publication Data
US 2021/0356739 A1 Nov. 18, 2021

(30) Foreign Application Priority Data
Oct. 18, 2018 (JP) .............................. JP2018-196459

(51) Int. Cl.
*G02B 27/01* (2006.01)
*H04N 13/363* (2018.01)

(52) U.S. Cl.
CPC ....... *G02B 27/0101* (2013.01); *H04N 13/363* (2018.05); *G02B 2027/013* (2013.01); *G02B 2027/0127* (2013.01)

(58) Field of Classification Search
CPC ........ G03B 21/10; G03B 21/28; G03B 21/56; G03B 21/62; G03B 21/145; G03B 21/208;
(Continued)

(56) References Cited

U.S. PATENT DOCUMENTS 5,024,521 A * 6/1991 Zuchowski .......... G03B 21/606
352/86
10,935,879 B2 * 3/2021 Martinez ................ G03B 21/62
(Continued)

FOREIGN PATENT DOCUMENTS

| CA | 2095612 A | 5/1992 |
|---|---|---|
| JP | 2003-57595 A | 2/2003 |

(Continued)

OTHER PUBLICATIONS

International Search Report and Written Opinion of PCT Application No. PCT/JP2019/038952, dated Nov. 26, 2019, 11 pages of ISRWO.

*Primary Examiner* — Sultan Chowdhury
(74) *Attorney, Agent, or Firm* — Chip Law Group

(57) ABSTRACT

An image display apparatus (100) according to the present invention includes a display unit and a projection unit. The display unit includes a curved first screen (43) and a curved second screen (44), the first screen extending along a predetermined axis (1), the curved screen having transparency and being disposed on a front side of the first screen (43) with a gap interposed therebetween. The projection unit includes an emitter (11) that emits light for displaying a first image from a region on the predetermined axis (1) and a second image superimposed on the first image, projects the first image onto the first screen (43), and projects the second image onto the second screen (44).

18 Claims, 14 Drawing Sheets

(58) Field of Classification Search
CPC .............. G03B 21/602; G03B 21/2066; G02B 27/0101; G02B 27/0103; G02B 27/0278; G02B 27/0284; G02B 27/0905; G02B 2027/013; G02B 2027/0127; G02B 2027/0185; G02B 2027/0278; H04N 13/363; H04N 13/395
See application file for complete search history.

(56) References Cited

U.S. PATENT DOCUMENTS

| | | | | |
|---|---|---|---|---|
| 2002/0034006 | A1* | 3/2002 | Kostrzewski | G03B 21/56 359/443 |
| 2005/0264882 | A1 | 12/2005 | Daiku | |
| 2011/0267588 | A1* | 11/2011 | Dai | G03B 21/28 353/98 |
| 2015/0022783 | A1* | 1/2015 | Lee | H04N 9/3161 353/82 |
| 2016/0033855 | A1* | 2/2016 | Wong | G03B 21/62 353/13 |

FOREIGN PATENT DOCUMENTS

| | | |
|---|---|---|
| JP | 2005-338346 A | 12/2005 |
| WO | 92/009006 A1 | 5/1992 |
| WO | 2018/163945 A1 | 9/2018 |

\* cited by examiner

IMAGE DISPLAY APPARATUS

CROSS REFERENCE TO RELATED APPLICATIONS

This application is a U.S. National Phase of International Patent Application No. PCT/JP2019/038952 filed on Oct. 2, 2019, which claims priority benefit of Japanese Patent Application No. JP 2018-196459 filed in the Japan Patent Office on Oct. 18, 2018. Each of the above-referenced applications is hereby incorporated herein by reference in its entirety.

TECHNICAL FIELD

The present technology relates to an image display apparatus that displays an image.

BACKGROUND ART

Patent Literature 1 describes a three-dimensional display apparatus that displays a three-dimensional object by projecting two-dimensional images. In this apparatus, a plurality of planar display surfaces is set at different depths in front of an observer. Each display surface is configured using a reflective holographic diffuser plate and a projector-type two-dimensional display apparatus, respectively. Moreover, a 2D image of the three-dimensional object using a viewpoint of the observer as a reference is displayed on each display surface. For example, the depth of the three-dimensional object can be expressed by adjusting the luminance and the like of each 2D image as appropriate (paragraphs [0013], [0016], [0025], [0026], and [0026], FIGS. 1 and 2, and the like of Patent Literature 1).

CITATION LIST

Patent Literature

Patent Literature 1: Japanese Patent Application Laid-open No. 2003-57595

DISCLOSURE OF INVENTION

Technical Problem

In Patent Literature 1, an image is displayed using the position of the observer as a reference, and thus a range in which an image having a depth can be displayed is limited in some cases. There is a demand for a technology capable of widening such a display range and displaying of an image with a sense of depth at a wider viewing angle.

In view of the above-mentioned circumstances, it is an object of the present technology to provide an image display apparatus capable of displaying of an image with a sense of depth at a wider viewing angle.

Solution to Problem

In order to accomplish the above-mentioned object, an image display apparatus according to an embodiment of the present technology includes a display unit and a projection unit.

The display unit includes a curved first screen and a curved second screen, the first screen extending along a predetermined axis, the second screen having transparency and being disposed in front of the first screen with a gap interposed therebetween.

The projection unit includes an emitter that emits, from a region on the predetermined axis, light for displaying a first image and a second image which is superimposed on the first image, projects the first image onto the first screen, and projects the second image onto the second screen.

In this image display apparatus, the curved first screen is disposed along the predetermined axis. The second screen having transparency is disposed in front of the first screen with a gap interposed therebetween. Moreover, the light displaying the first image and the second image which is superimposed on it is emitted from the region on the predetermined axis, and the first image and the second image are projected onto the first screen and the second screen, respectively. Accordingly, the images are displayed in a superimposed manner on the two curved surfaces, and an image with a sense of depth at a wider viewing angle can be displayed.

The predetermined axis may extend through the gap between the first screen and the second screen. In this case, the projection unit may project the first image and the second image along an optical path extending through the gap.

Accordingly, the optical path of the light for displaying the first image and the second image can be formed between the first screen and the second screen, and for example, the apparatus size can be reduced.

The first screen may diffuse and reflect light for displaying the first image. In this case, the second screen may diffuse and transmit light for displaying the second image.

Accordingly, the first image and the second image can be displayed brightly, for example. As a result, a bright image can be displayed in a superimposed manner, and the visibility can be enhanced.

The display unit may include a substantially tubular transparent base material having a curved cylindrical surface and a transparent screen that is disposed on either one of an inner surface and an outer surface of the transparent base material.

Accordingly, a transparent all-around screen or the like, for example, is configured, an image with a sense of depth can be displayed in the azimuth of 360 degrees, and the viewing angle can be sufficiently widened.

The transparent screen may be a transmissive screen disposed on the inner surface of the transparent base material. In this case, the first screen may be formed as the outer surface of the transparent base material. Moreover, the second screen may be formed as the transmissive screen.

Accordingly, the first screen and the second screen can be easily configured.

The transparent screen may be a reflective screen disposed on the outer surface of the transparent base material. In this case, the first screen may be formed as the reflective screen. Moreover, the second screen may be formed as the inner surface of the transparent base material.

Accordingly, the first screen and the second screen can be easily configured.

The display unit may include a curved reflective screen and a curved transmissive screen that are disposed with the gap interposed therebetween. In this case, the first screen may be formed as the reflective screen. Moreover, the second screen may be formed as the transmissive screen.

Accordingly, sufficiently bright images can be displayed on the first screen and the second screen, for example, and an image with a sense of depth, which is excellent in visibility, can be displayed.

The first screen and the second screen may be disposed along a circular cylindrical surface having the predetermined axis as a central axis.

Accordingly, an image with a sense of depth can be uniformly displayed in the full azimuth of 360 degrees, for example, and an image with a sense of depth can be properly displayed irrespective of a viewing position.

The first screen and the second screen may be disposed along an elliptical cylindrical surface having the predetermined axis as a central axis.

Accordingly, an image with a sense of depth can be displayed in a wide range, for example, and stereoscopic display with a sense of immersion and the like can be realized.

The image display apparatus may further include a display control unit that controls display of the first image and the second image.

Accordingly, an image with a sense of depth can be displayed with high accuracy, and an excellent visual effect can be exhibited.

Either one of the first image and the second image is a main image and the other one may be a sub-image. In this case, the display control unit may control a display parameter of the sub-image in accordance with a display state of the main image.

Accordingly, the sense of depth or the like of the main image can be sufficiently expressed without deteriorating the display quality of the main image, and image display with a high entertainment value can be realized.

The display parameter may include at least one of luminance, resolution, or saturation of the sub-image.

Accordingly, the sense of depth or the like of the main image, for example, can be naturally expressed, and a high-quality image can be displayed.

The second image may be the main image that displays a main display object. In this case, the first image may be the sub-image that displays a sub-display object including at least one of a shadow of the main display object or a background of the main display object.

Accordingly, the sense of depth, the sense of float, and the like of the main image, for example, can be sufficiently enhanced.

The display control unit may control at least one of a size or a display speed of the sub-display object such that motion parallax with respect to the main display object is obtained.

Accordingly, the sense of depth, the sense of float, and the like of the main image, for example, can be naturally expressed.

The image display apparatus may further include a detector that detects an observation position of an observer. In this case, the display control unit may control display of the first image and the second image in accordance with the detected observation position.

Accordingly, an image with a sense of depth display, for example, can be properly realized irrespective of the observation position.

The first image and the second image may be both images that display a main display object. In this case, the display control unit may generate a projected image of the main display object onto the first screen from the observation position as the first image and generate a projected image of the main display object onto the second screen from the observation position as the second image.

Accordingly, the main display object can be stereoscopically displayed, and an excellent visual effect can be exhibited.

The display control unit may acquire depth information of the main display object and control luminance of the first image and the second image on the basis of the depth information.

Accordingly, the stereoscopic sense of the main display object can be sufficiently enhanced, and high-quality stereoscopic display can be realized.

The projection unit may include an optical unit that reflects or refracts the image light emitted from the emitter, project the first image onto the first screen, and project the second image onto the second screen.

Accordingly, images can be properly displayed on the first screen and the second screen.

The display unit may include a screen using a diffractive optical element.

Accordingly, a curved screen having high transparency and the like can be configured, for example, and the display of an image with a sense of depth and a high sense of float and the like can be realized.

Advantageous Effects of Invention

As described above, in accordance with the present technology, it is possible to display an image with a sense of depth at a wider viewing angle. It should be noted that the effects described here are not necessarily limitative and any effect described in the present disclosure may be provided.

MODE(S) FOR CARRYING OUT THE INVENTION

Hereinafter, embodiments according to the present technology will be described with reference to the drawings.

First Embodiment

[Configuration of Image Display Apparatus]

Figure 1A:
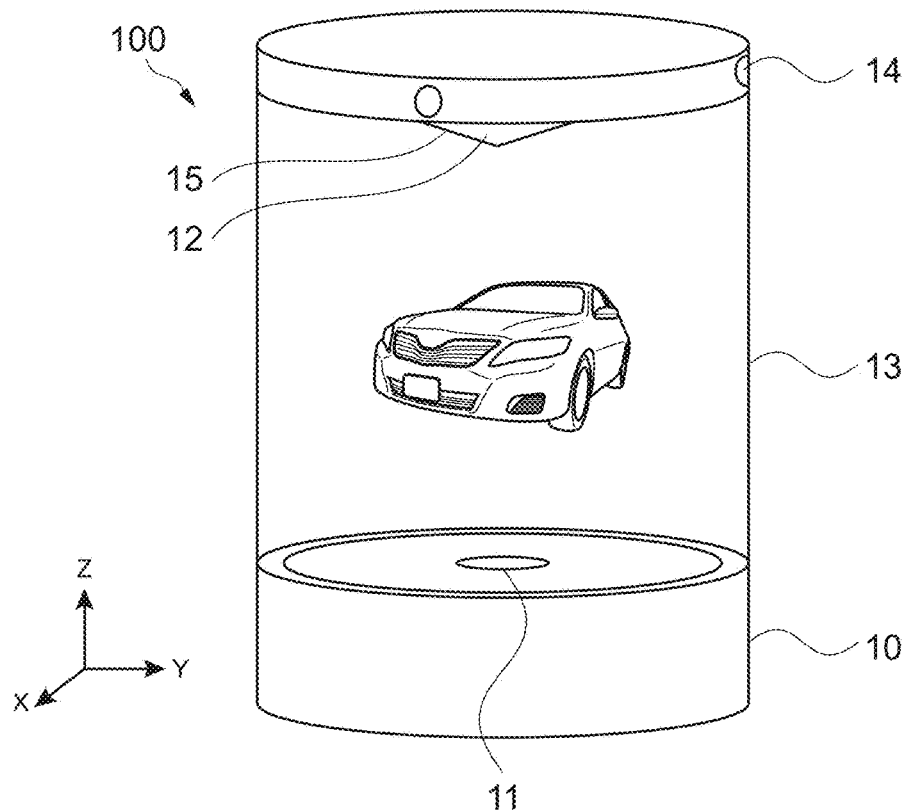
FIGS. 1A and 1B Schematic diagrams showing a configuration example of an image display apparatus according to a first embodiment of the present technology.
Figure 1B:
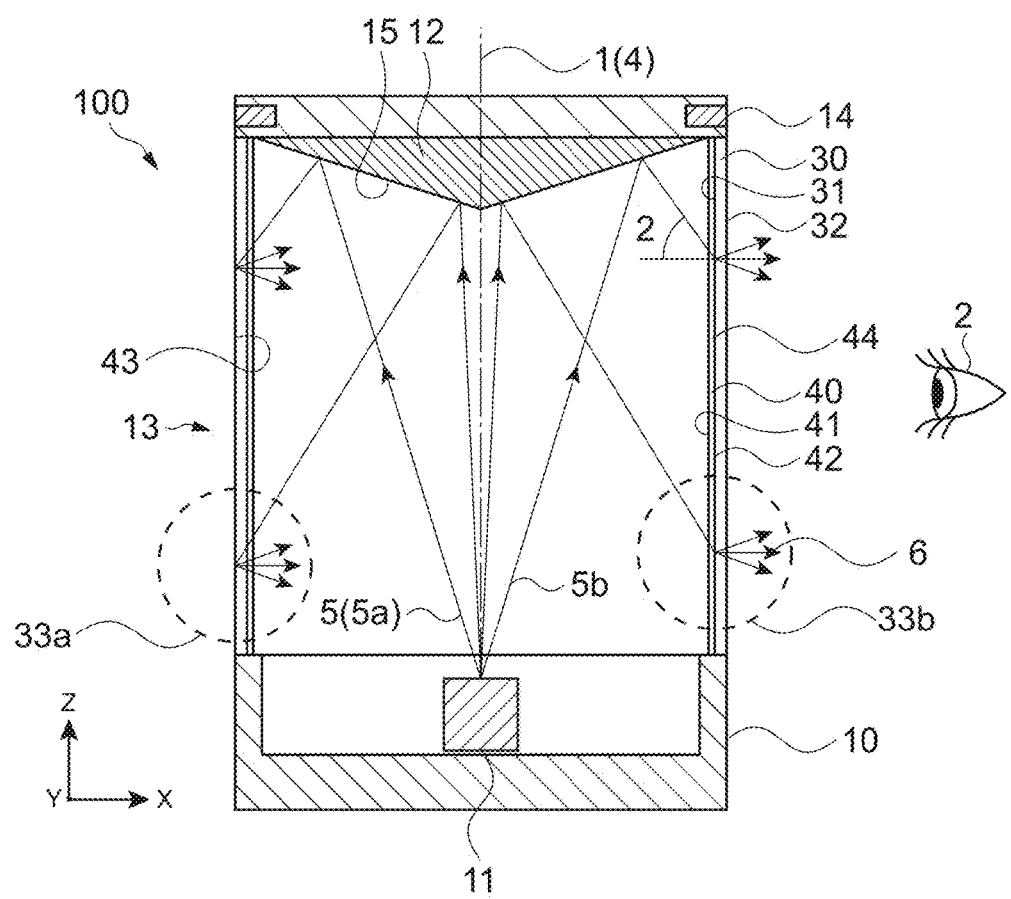

FIGS. 1A and 1B are schematic diagrams showing a configuration example of an image display apparatus according to a first embodiment of the present technology. FIG. 1A is a perspective view schematically showing the outer appearance of an image display apparatus 100. FIG. 1B is a cross-sectional view schematically showing a configuration example of the image display apparatus 100.

As shown in FIG. 1A, the image display apparatus 100 generally has a substantially cylindrical shape, and it is used by placing one bottom surface on an arrangement surface such as a floor. In the following description, a plane direction in which the image display apparatus 100 is disposed is an XY plane direction and an up-and-down direction of the image display apparatus 100 is a Z direction.

The image display apparatus 100 includes a pedestal 10, an emitter 11, a reflection mirror 12, a screen unit 13, and a detection camera 14. The image display apparatus 100 further includes a storage unit 20 (not shown) and a controller 21 (see FIG. 3).

The screen unit 13 of the image display apparatus 100 is a cylindrical screen having transparency (transparent cylindrical screen). Hereinafter, the axis (central axis) that is the center of the screen unit 13 (image display apparatus 100) will be referred to as a reference axis 1. Therefore, the image display apparatus 100 has a cylindrical shape extending along the reference axis 1. In this embodiment, the reference axis 1 corresponds to a predetermined axis.

It should be noted that "having transparency" in the present disclosure includes both transparent and semi-transparent forms and also includes colored forms. For example, in a case where the rear of a member can be visually recognized in a see-through manner, the member can be considered as a member having transparency. Moreover, a member transmissive to at least part of visible light is also included in the member having transparency.

In FIG. 1B, the cross section obtained by cutting the image display apparatus 100 in an XZ plane direction including the reference axis 1 is schematically shown. In FIG. 1B, a viewpoint of a user 2 viewing the image display apparatus 100 (screen unit 13) in the X direction is also schematically shown. For example, a side (right side in the figure) on which the user 2 is present is the front side of the image display apparatus 100. Moreover, a side (left side in the figure) opposite to the user 2 across the image display apparatus 100 is the rear side of the image display apparatus 100.

The user 2 is an observer who observes the image display apparatus 100. For example, in a state in which no images are displayed, the user 2 can visually recognize the background of the screen unit 13, i.e., a landscape and the like on the rear side of the screen unit 13 in a see-through manner.

Moreover, when an image is displayed on the screen unit 13, the user 2 can visually recognize, for example, an image and the like floating inside the screen unit 13.

The pedestal 10 is provided in a lower portion of the image display apparatus 100 and supports the screen unit 13 over the entire circumference of 360 degrees. The emitter 11, the storage unit 20, and the controller 21 are installed inside the pedestal 10. It should be noted that in FIG. 1B, the storage unit 20 and the controller 21 are not shown. Moreover, a power supply source such as a battery (not shown), a speaker, other elements necessary for the operation of the image display apparatus 100, and the like are provided as appropriate inside the pedestal 10.

The emitter 11 radially emits image light 5 along an optical axis 4. The image light 5 is light constituting an image and is, for example, constituted by light (light ray) for displaying each pixel. In the image display apparatus 100, a display image is generated by the controller 21, for example. The emitter 11 generates the image light 5 constituting this display image and emits the generated image light 5 along the optical axis 4.

The emitter 11 is installed inside the pedestal 10, directed to an upper portion of the image display apparatus 100 such that the optical axis 4 and the reference axis 1 of the screen unit 13 are substantially coincident with each other. Therefore, the emitter 11 radially emits the image light 5 toward the upper portion of the image display apparatus 100 from a region on the reference axis 1 of the screen unit 13 along the reference axis 1 (optical axis 4).

For example, as shown in FIG. 1B, in the plane (XZ plane) including the reference axis 1, the image light 5 is emitted at a predetermined angle of view from the emitter 11 on the reference axis 1. Hereinafter, light emitted to a side (rear side) opposite to the user 2 with respect to the optical axis 4 will be referred to as image light 5a and light emitted to the user 2 side (front side) with respect to the optical axis 4 will be referred to as image light 5b.

In FIG. 1B, a rear inner optical path having a smaller angle of emission, which is closer to the optical axis 4, and a rear outer optical path having a larger angle of emission, which is further from the optical axis 4, are schematically shown as optical paths of the image light 5a emitted to the rear side. Moreover, a front inner optical path having a smaller angle of emission, which is closer to the optical axis 4, and a front outer optical path having a larger angle of emission, which is further from the optical axis 4, are schematically shown as optical paths of the image light 5b emitted to the front side. It should be noted that the angle of emission is, for example, an angle between the optical axis 4 and a traveling direction of the emitted image light 5.

For example, a color projector of a laser scanning type that displays each pixel by scanning laser light corresponding to each RGB color or the like is used as the emitter 11. The specific configuration of the emitter 11 is not limited, and for example, a small mobile projector (pico projector), a projector using single-color laser light, or the like may be used as appropriate in accordance with the size, application, and the like of the image display apparatus 100. Alternatively, an arbitrary projector capable of projecting the image light 5 may be used.

The reflection mirror 12 is connected to the upper portion of the screen unit 13. The reflection mirror 12 has a reflection surface 15 that reflects the image light 5 emitted by the emitter 11. The reflection mirror 12 is disposed to face the emitter 11 with reference to the optical axis 4 (reference axis 1) such that the reflection surface 15 faces the emitter 11. Therefore, it can also be said that the reflection mirror 12 constitutes an inner top surface of the image display apparatus 100.

As shown in FIG. 1B, the image light 5 emitted from the emitter 11 toward the top surface of the image display apparatus 100 is reflected toward an inner surface of the screen unit 13 by the reflection surface 15 formed on the top surface. Thus, it can also be said that the reflection mirror 12 reflects the image light 5 to thereby control its optical path. In this embodiment, the reflection mirror 12 corresponds to an optical unit.

In this embodiment, the reflection surface 15 has a rotationally symmetric shape using the optical axis 4 as a reference. Specifically, the reflection surface 15 includes a rotation surface obtained by rotating a curve cut out from a part of a parabola by using the optical axis 4 as a reference. The rotation surface is configured such that the side corresponding to the concave part of the parabola (focal side of the parabola) is a side (reflection surface 15) that reflects light and that the axis of the parabola and the optical axis 4 are different from each other. It should be noted that in FIG. 1B, the cross-sectional shape of the reflection surface 15 is schematically shown with the straight lines.

The image light 5 radially emitted upward from the emitter 11 is radially reflected toward the entire circumference of the screen unit 13 by the reflection surface 15 of the reflection mirror 12. Since the reflection surface 15 is the rotation surface of the parabolic shape, the angle of incidence $\theta$ of the reflected image light 5 to the screen unit 13 is substantially constant. Here, the angle of incidence $\theta$ is, for example, an angle between an incident direction of the image light 5 and a normal direction of an incident position in an incident surface (inner surface of the screen unit 13).

Thus, the reflection mirror 12 controls the angle of incidence $\theta$ of the image light 5 to the screen unit 13 to be substantially constant. That is, the image light 5 reflected by the reflection mirror 12 is emitted toward the screen unit 13 as substantially parallel light. It should be noted that it is not limited to the case where the reflection surface 15 is configured using the parabola, and for example, a free-form surface or the like capable of reflecting the image light 5 as substantially parallel light may be used as appropriate.

For example, an arbitrary material such as a resin such as an acrylic resin, glass, and metal may be used as the constituent material of the reflection mirror 12. For example, the reflection mirror 12 is configured by performing mirror finishing on the surface of such a material to have surface roughness Ra<about 0.1 μm. Alternatively, the reflection surface 15 may be provided with a high reflectance coating using a thin film of aluminum, silver, or the like, a protective coating using a thin film such as an $SiO_2$ film and a polymeric film, or the like. In addition, the specific configuration and the like of the reflection mirror 12 are not limited.

The screen unit 13 is connected to an upper portion of the pedestal 10. Moreover, the reflection mirror 12 is connected to the upper portion of the screen unit 1. Therefore, the image display apparatus 100 has a configuration in which the reflection mirror 12 is disposed on the top surface of the screen unit 13 that is the transparent cylindrical screen and the emitter 11 that is a video source is disposed in the center of the cylinder. As shown in FIG. 1B, the screen unit 13 includes a transparent base material 30 and a transparent screen 40. In this embodiment, the screen unit 13 corresponds to a display unit.

The transparent base material 30 has a cylindrical shape centered on the reference axis 1 and functions as a support member that supports the transparent screen 40. The transparent base material 30 has a first surface 31 directed to the reference axis 1 and a second surface 32 opposite to the first surface 31.

The first surface 31 is an inner circumferential surface of the transparent base material 30 and is an inward-directed cylindrical surface having the reference axis 1 as a central axis. The second surface 32 is an outer circumferential surface of the transparent base material 30 and is an outward-directed cylindrical surface having the reference axis 1 as a central axis. It should be noted that a slit or the like may be provided in a part of the transparent base material 30. Thus, the transparent base material 30 has a substantially tubular shape having a curved cylindrical surface. In this embodiment, the first surface 31 corresponds to an inner surface of the transparent base material and the second surface 32 corresponds to an outer surface of the transparent base material.

For example, a transparent resin material (plastic) such as an acrylic resin and polycarbonate is used for the material of the transparent base material 30. The use of the resin material can save the weight of the apparatus. In addition, the specific configuration of the transparent base material 30 is not limited, and for example, an arbitrary resin material transmissive to visible light, a glass material, or the like may be used as appropriate as the transparent base material 30. Moreover, for example, the transparent base material 30 may be configured using a sufficiently transparent material having a high transmittance, a semi-transparent material having a predetermined transmittance set, or the like.

The transparent screen 40 is disposed on the first surface 31 of the transparent base material 30. Typically, the transparent screen 40 is provided over the entire inner surface (first surface 31) of the transparent base material 30. The transparent screen 40 has a cylindrical shape centered on the reference axis 1 and has a third surface 41 directed to the reference axis 1 and a fourth surface 42 opposite to the third surface 41.

The third surface 41 is the inner circumferential surface of the transparent screen 40 and is an inward-directed cylindrical surface centered on the reference axis 1. The fourth surface 42 is an outer circumferential surface of the transparent screen 40 and is an outward-directed cylindrical surface centered on the reference axis 1. Therefore, the third surface 41 and the fourth surface 42 of the transparent screen 40 are curved cylindrical surfaces.

The fourth surface 42 of the transparent screen 40 is a surface in contact with the first surface 31 of the transparent base material 30. That is, the fourth surface 42 (or the first surface 31) serves as an interface at which the transparent screen 40 and the transparent base material 30 are in contact with each other. Moreover, the third surface 41 of the transparent screen 40 (inner surface of the screen unit 13) serves as an interface between the transparent screen 40 and the air layer. It should be noted that the second surface 32 of the transparent base material 30 (outer surface of the screen unit 13) serves as an interface between the transparent base material 30 and the air layer.

The transparent screen 40 has an optical function for displaying an image. Specifically, the transparent screen 40 has a diffusion function of diffusing and emitting the image light 5. Moreover, the transparent screen 40 is made from a material having transparency (light transmittance). Therefore, the screen unit 13 through which the background can be seen is configured by providing the transparent screen 40 in the transparent base material 30.

The transparent screen 40 is a screen using a diffractive optical element. The diffractive optical element (DOE) is an optical element that diffracts light. For example, a holographic optical element (HOE) that diffracts light by using interference fringes recorded on a hologram is used as the diffractive optical element. Therefore, the transparent screen 40 is an HOE screen configured using the HOE.

For example, interference fringes between reference light entering at a predetermined angle of incidence θ and diffuse light (object light) generated by the use of a diffusion plate or the like are recorded on the hologram. As a result, light entering the hologram at the predetermined angle of incidence θ is selectively diffracted by the interference fringes and emitted as the diffuse light. Accordingly, the transparent screen 40 which diffuses light of the predetermined angle of incidence θ and allows light entering at other angles to pass therethrough can be configured, for example.

For example, a material such as a photopolymer (photosensitive material, or the like) or a UV curable resin can be used for the hologram. A hologram having a desired optical function can be configured by storing interference fringes in such a material as appropriate. Moreover, for example, a volume-type hologram for making interference fringes as changes in refractive index inside the material, a relief-type hologram for making interference fringes as irregularities of the material surface, or the like is used for the system that stores the interference fringes.

In this embodiment, a screen using a transmissive hologram (transmissive HOE) is configured as the transparent screen 40. The transmissive hologram is a hologram that controls the traveling direction of the light entering from one surface and emits the light from the other surface. Thus, the transparent screen 40 is a transmissive screen that allows the image light 5 to pass therethrough and emits the image light 5 as diffuse light 6.

The transparent screen 40 is configured to function only for the angle of incidence θ of the image light 5 reflected by the top surface (reflection surface 15) and diffuse the image light 5 entering from the inside to the outside of the cylinder, for example. That is, the image light 5 entering at the angle of incidence θ from the inside (third surface 41) of the transparent screen 40 is selectively diffracted by the interference fringes inside the transparent screen 40 and is emitted toward the outside (fourth surface 42) of the transparent screen 40 as the diffuse light.

In this embodiment, a display screen that displays an image toward the user 2 is formed by the transparent base material 30 and the transparent screen 40 described above. Here, the display screen is, for example, a screen capable of displaying an image formed by projecting the image light 5 toward the user 2. Hereinafter, the display screen will be described specifically.

Figure 2A:
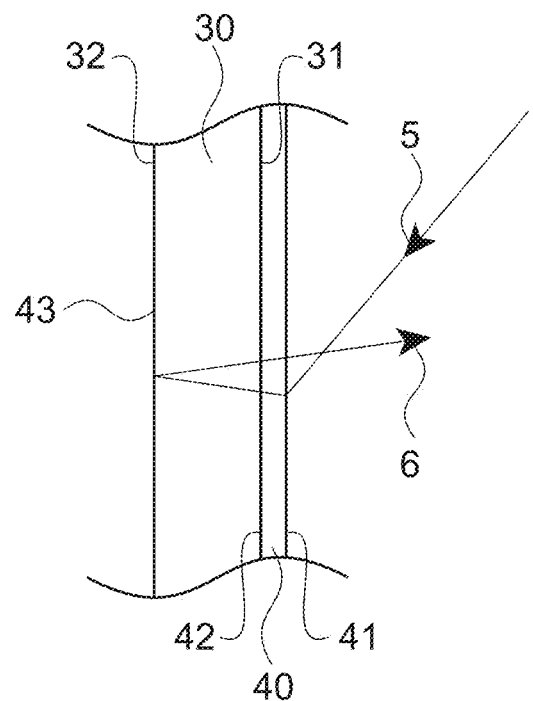
FIGS. 2A and 2B Schematic diagrams showing examples of an optical path of image light entering a screen unit.
Figure 2B:
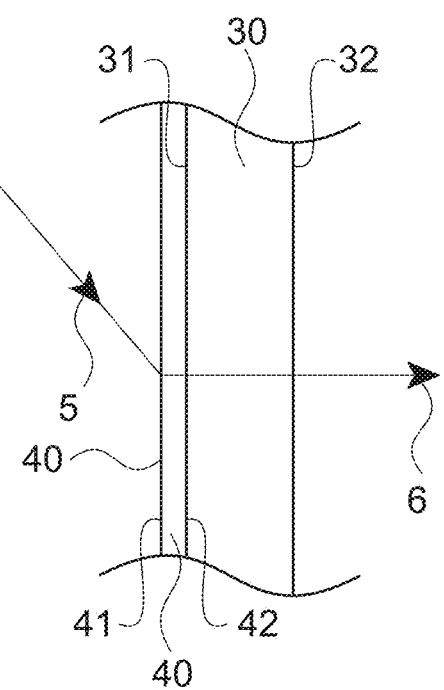

FIGS. 2A and 2B are schematic diagrams showing examples of an optical path of the image light 5 entering the screen unit 13. FIG. 2A is an example of the optical path of the image light 5 entering the rear side of the screen unit 13 as viewed from the user 2 and is an enlarged view of a dotted-line region 33a shown in FIG. 1B. FIG. 2B is an example of the optical path of the image light 5 entering the front side of the screen unit 13 as viewed from the user 2 and is an enlarged view of a dotted-line region 33b shown in FIG. 1B.

As shown in FIG. 2A, it is assumed that the image light 5 enters the screen unit 13 on the rear side at the predetermined angle of incidence θ. The image light 5 enters the third surface 41 of the transparent screen 40, which is the inner surface of the screen unit 13, is diffracted by the interference fringes in the transparent screen 40. The diffracted image light 5 is emitted from the fourth surface 42 of the transparent screen 40 as the diffuse light 6.

It should be noted that in FIG. 2A, one optical path through which the image light 5 as the diffuse light 6 passes is shown as an example. In practice, the image light 5 diffracted by the interference fringes is diffused in various directions and travels toward the transparent base material 30 from the fourth surface 42.

The image light 5 (diffuse light 6) diffracted by the transparent screen 40 penetrates into the transparent base material 30 from the first surface 31 of the transparent base material 30. For example, the refractive index of the transparent screen 40 and the refractive index of the transparent base material 30 are set to be substantially the same value (e.g., 1.5 or the like). Therefore, refraction, reflection, and the like of the image light 5 hardly occur at the interface between the transparent screen 40 and the transparent base material 30 (the fourth surface 42 and the first surface 31).

The image light 5 entering the transparent base material 30 from the first surface 31 travels to the second surface 32 outside the transparent base material 30. As described above, the second surface 32 is the interface between the transparent base material 30 and the air layer. Therefore, surface reflection occurs at the second surface 32 due to the difference in refractive index between the transparent base material 30 and the air layer. That is, the second surface 32 functions as a reflection surface that reflects the image light 5.

As a result, part of the image light 5 entering the second surface 32 is reflected to the inside of the screen unit 13. The reflected image light 5 passes through the transparent screen 40 and is emitted from the third surface 41. That is, in the screen unit 13 on the rear side, part of the diffuse light 6 diffracted by the transparent screen 40 is emitted to the front side (right side in the figure) on which the user 2 is present. It should be noted that the other part of the image light 5 entering the second surface 32 travels to the air layer as it is and is emitted to the rear side (left side in the figure).

Therefore, on the rear side of the screen unit 13, the outer surface of the transparent base material 30 (second surface 32) serves as the reflection surface and a display screen that displays, to the front side, an image configured by the image light 5a emitted to the rear side from the emitter 11 is formed. Hereinafter, the display screen formed on the screen unit 13 on the rear side will be referred to as a rear screen 43.

Thus, in this embodiment, the rear screen 43 is formed by the outer surface of the transparent base material 30. For example, as shown in FIG. 1B, in a case where the user 2 is viewing the screen unit 13 in the X direction, the second surface 32, which is included on the rear side of the screen unit 13 cut in the YZ plane direction including the reference axis 1 and is a semi-cylindrical surface, functions as the rear screen 43.

Therefore, the semi-cylindrical rear screen 43 having the reference axis 1 as a central axis is formed at the rear half of the screen unit 13 as viewed from the user 2. Thus, the screen unit 13 has the curved rear screen 43 extending along the reference axis 1. In this embodiment, the rear screen 43 corresponds to a first screen.

In FIG. 1B, the diffuse light 6 diffused by the transparent screen 40 and reflected by the second surface 32 is schematically shown. This diffuse light 6 is the diffuse light 6 emitted from the rear screen 43, passes through the screen unit 13 on the front side, and travels toward the user 2. As a result, the user 2 can visually recognize an image (hereinafter, referred to as rear image) displayed on the rear screen 43.

It should be noted that in a case where the user 2 moves, the rear screen 43 is formed on the rear half of the screen unit 13 as viewed from the position of the user 2 after movement. That is, the rear screen 43 is disposed along the cylindrical surface having the reference axis 1 as a central axis.

In such a case where the surface reflection is used for the rear screen 43, a structure or the like that actively increases the reflectance of the surface reflection for the reflection surface (second surface 32 of the transparent base material 30) may be provided. For example, it is possible to increase the reflectance on the second surface 32 by providing a dielectric monolayer film, a dielectric multilayer film, or the like in the second surface 32 of the transparent base material 30. Accordingly, it is possible to improve the brightness and the like of an image displayed on the rear screen 43.

As shown in FIG. 2B, the image light 5 entering the screen unit 13 on the front side at the predetermined angle of incidence $\theta$ enters the third surface 41 of the transparent screen 40 which is the inner surface of the screen unit 13. The image light 5 entering the third surface 41 is diffracted by the interference fringes in the transparent screen 40 and is emitted from the fourth surface 42 of the transparent screen 40 as the diffuse light 6. In the transparent screen 40, for example, the third surface 41 serves a display surface that emits the diffuse light 6 and displays an image on the front side.

The image light 5 (diffuse light 6) diffracted by the transparent screen 40 penetrates into the transparent base material 30 from the first surface 31 of the transparent base material 30 and travels to the second surface 32 outside the transparent base material 30. Part of the image light 5 travelling to the second surface 32 is emitted as it is from the second surface 32 to the front side (right side in the figure) on which the user 2 is present. It should be noted that the other part of the image light 5 travelling to the second surface 32 is reflected by the second surface 32 to the rear side (left side in the figure).

Therefore, on the front side of the screen unit 13, the part of the diffuse light 6 diffused by the transparent screen 40 is emitted toward the user 2 as it is. As a result, a display screen that displays, to the front side, an image configured by the image light 5a emitted to the front side from the emitter 11 is formed. Hereinafter, the display screen formed on the screen unit 13 on the front side will be referred to as a front screen 44.

As described above, in this embodiment, the front screen 44 is formed by the transmissive transparent screen 40. For example, in a case where the user 2 is viewing the screen unit 13 in the X direction as shown in FIG. 1B, the third surface 41, which is included in the front side of the screen unit 13 cut in the YZ plane direction including the reference axis 1 and is a semi-cylindrical surface, functions as the front screen 44.

Therefore, the semi-cylindrical front screen 44 is formed in front of the rear screen 43 across the cylindrical space inside the screen unit 13. Thus, the screen unit 13 includes the curved front screen 44 which is disposed in front of the rear screen 43 with a gap interposed therebetween and has transparency. In this embodiment, the front screen 44 corresponds to a second screen.

In FIG. 1B, the diffuse light 6 diffused by the transparent screen 40 on the front side is schematically shown. This diffuse light 6 is the diffuse light 6 emitted from the front screen 44, and travels toward the user 2 from the front surface of the image display apparatus 100 as it is. As a result, the user 2 can visually recognize an image (hereinafter, referred to as front image) displayed on the front screen 44.

It should be noted that in a case where the user 2 moves, the front screen 44 is formed at the front half of the screen unit 13 as viewed from the position of the user 2 after movement. That is, the front screen 44 is disposed along the cylindrical surface having the reference axis 1 as a central axis.

Thus, the screen unit 13 includes the two display screens (rear screen 43 and front screen 44) having curvature. The rear screen 43 is formed by the reflection surface (second surface 32) located relatively outside in the cylindrical screen unit 13. Moreover, the front screen 44 is formed by the transmissive transparent screen 40 located relatively inside in the cylindrical screen unit 13.

The image light 5 emitted from the emitter 11 is projected onto each display screen. That is, the images are projected onto both the rear screen 43 and the front screen 44 by the use of the single projection source (emitter 11). By displaying suitable images on the rear screen 43 and the front screen 44, it is possible to display an image with a sense of depth as viewed from the observation position of the user 2. This point will be described later in detail.

Moreover, the optical systems such as the emitter 11 and the reflection mirror 12 are disposed on the reference axis 1 of the screen unit 13. As shown in FIG. 1B, the reference axis 1 passes through the gap between the rear screen 43 and the front screen 44. The optical systems are simplified by constructing the optical systems around the reference axis 1 between the rear screen 43 and the front screen 44 in this manner. Thus, it is possible to realize miniaturization of the apparatus and the like, for example.

The detection camera 14 is a camera for detecting an observation position P of the user 2 and the position and the angle of view are set to be capable of imaging the entire viewing range for viewing the image display apparatus 100. In this embodiment, an area all around the cylindrical screen unit 13 is the viewing range, in which the user 2 can view an image while moving. The detection camera 14 is capable of imaging the face of the user 2 at an arbitrary position within the viewing range.

In FIG. 1A and FIG. 1B, a plurality of detection cameras 14 disposed above the reflection mirror 12 in a state in which the plurality of detection cameras 14 is directed to the outside of the cylindrical screen unit 13 is schematically shown. The positions at which the detection cameras 14 are installed, the number of detection cameras 14, and the like are not limited. For example, the detection camera 14 may be installed on the pedestal 10 or the detection camera 14 may be installed outside the image display apparatus 100.

For example, a digital camera including an image sensor such as a complementary metal-oxide semiconductor (CMOS) sensor and a charge coupled device (CCD) sensor is used as the detection camera 14. Alternatively, an infrared camera equipped with an infrared light such as an infrared LED may be used, for example.

Figure 3:
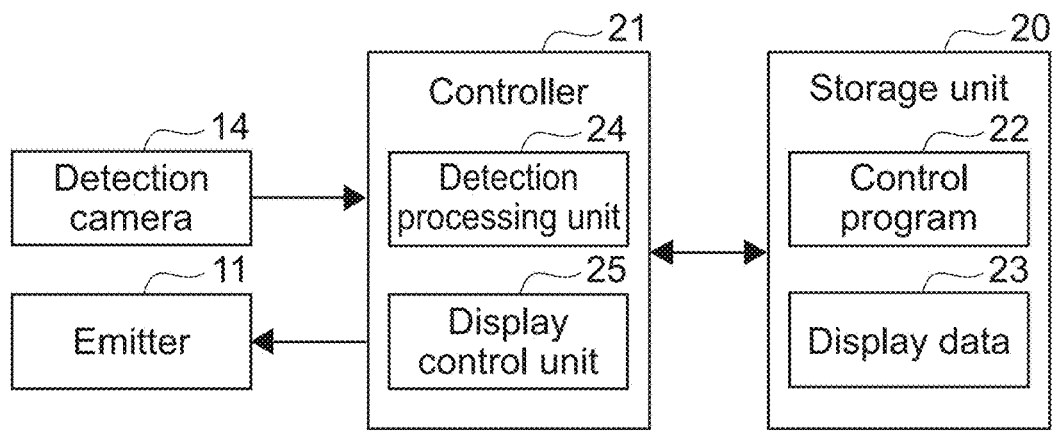
FIG. 3A block diagram showing a functional configuration example of the image display apparatus.

FIG. 3 is a block diagram showing a functional configuration example of the image display apparatus 100. The image display apparatus 100 further includes the storage unit 20 and the controller 21.

The storage unit 20 is a nonvolatile storage device and a hard disk drive (HDD) or the like is used, for example. The storage unit 20 stores a control program 22 for controlling the general operations of the image display apparatus 100. Moreover, the storage unit 20 stores display data 23 for performing image display. The method of installing the control program 22, the display data 23, and the like in the image display apparatus 100 is not limited.

The controller 21 controls the operation of each block of the image display apparatus 100. The controller 21 has hardware configurations necessary for a computer, such as a CPU and memories (RAM and ROM), for example. The CPU loads the control program 22 stored in the storage unit 20 into the RAM and executes the loaded control program 22 to thereby perform various types of processing.

For example, a programmable logic device (PLD) such as a field programmable gate array (FPGA) or another device such as an application specific integrated circuit (ASIC) may be used as the controller 21.

In this embodiment, the CPU of the controller 21 executes a program according to this embodiment, to thereby implement a detection processing unit 24 and a display control unit 25 as the functional blocks. It should be noted that dedicated hardware such as an integrated circuit (IC) may be used as appropriate in order to implement each functional block.

The detection processing unit 24 detects the observation position P of the user 2 on the basis of an image taken by the detection camera 14. For example, a viewpoint position of the user 2 is detected as the observation position P of the user 2. The detection processing unit 24 detects an azimuth in which the viewpoint of the user 2 is present, a distance to the viewpoint of the user 2, a height of the viewpoint, and the like, for example. It should be noted that the present technology is not limited to the case of detecting the viewpoint position (azimuth, distance, height, or the like) as the observation position P, and for example, an azimuth, a distance, or the like of the user 2 his or herself may be detected.

The method of detecting the observation position P from the image of the user 2 is not limited, and any face recognition technique, image analysis technique, and the like may be used. Alternatively, the observation position P may be detected by using a machine learning algorithm or the like using a deep neural network (DNN).

As described above, the image display apparatus 100 has a function of detecting the position of the observer (user 2). In this embodiment, the detection camera 14 and the detection processing unit 24 realize a detector that detects the observation position of the observer.

The display control unit 25 generates an image to be displayed on the screen unit 13. Specifically, image data including the image to be displayed on the screen unit 13 is generated. Moreover, the display control unit 25 performs the display control of an image in the screen unit 13 by adjusting display parameters such as the image's position in the image data, size, and luminance, for example.

Figure 4:
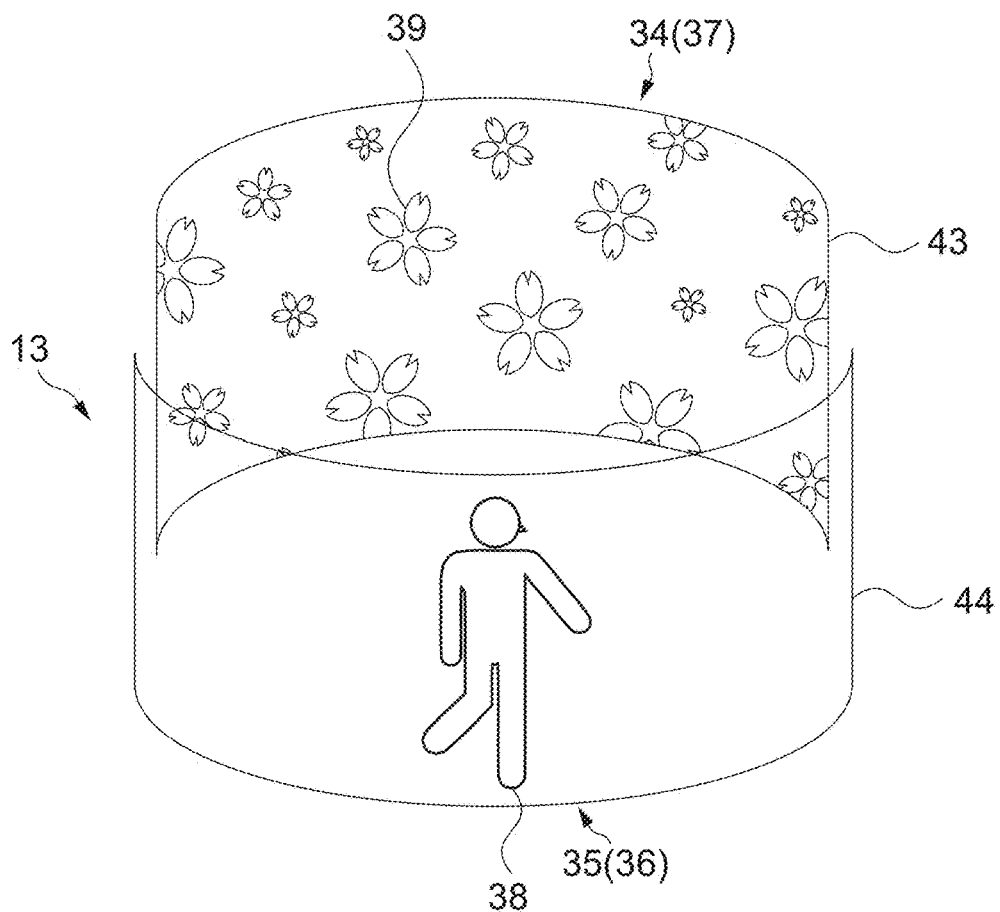
FIG. 4A schematic diagram showing a display example of the image display apparatus.

In this embodiment, the display control unit 25 generates the rear image 34 and the front image 35 which is superimposed on the front of the rear image 34 (see FIG. 4 and the like). The rear image 34 is an image to be displayed on the rear screen 43. Moreover, the front image 35 is an image to be displayed on the front screen 44. That is, the display control unit 25 generates two types of images to be displayed on the front side and the rear side as viewed from the user 2. In this embodiment, the rear image 34 corresponds to a first image and the front image 35 corresponds to a second image.

For example, the display control unit 25 generates image data including the rear image 34 and the front image 35. The rear image 34 and the front image 35 are generated on the basis of the display data 23 stored in the storage unit 20, for example. Alternatively, display data may be read from an external device of the image display apparatus 100 via a communication unit (not shown) or the like.

Moreover, in a case of generating the image data, the display parameters (position, size, luminance, or the like) of the rear image 34 and the front image 35 in the image data are adjusted as appropriate. Accordingly, it is possible for the display control unit 25 to control the display of the rear image 34 and the front image 35. The rear image 34 and the front image 35 and a method of controlling their display will be described later in detail.

[Basic Operation of Image Display Apparatus]

Hereinafter, the basic operation of the image display apparatus 100 will be described with reference to the optical path shown in FIG. 1B. First, image data including the rear image 34 and the front image 35 is generated by the display control unit 25. The generated image data is output from the controller 21 to the emitter 11.

The image light 5 for displaying the rear image 34 and the front image 35 to be superimposed on the rear image 34 is emitted by the emitter 11 from the region on the reference axis 1. In the example shown in FIG. 1B, the image light 5a emitted to the rear side of the image display apparatus 100 is the image light 5 for displaying the rear image 34. Moreover, the image light 5b emitted to the front side of the image display apparatus 100 is the image light 5 for displaying the front image 35.

The image light 5 emitted from the emitter 11 is reflected by the reflection surface 15 of the reflection mirror 12 and is emitted as substantially parallel light. The image light 5 as the substantially parallel light enters the inner surface of the screen unit 13 (third surface 41 of the transparent screen 40) at the substantially constant angle of incidence $\theta$. Accordingly, it is possible for the transparent screen 40 to diffuse the image light 5 with high diffraction efficiency. As a result, it is possible to display a bright image or the like having luminance unevenness or the like suppressed, for example.

As shown in FIG. 1B, the image light 5a emitted to the rear side is reflected by the reflection mirror 12 and enters the rear screen 43 (second surface 32 outside the transparent base material 30). Moreover, the image light 5b emitted to the front side is reflected by the reflection mirror 12 and enters the front screen 44 (third surface 41 outside the transparent screen 40).

That is, the reflection mirror 12 reflects the image light 5 emitted from the emitter 11, projects the rear image 34 on the rear screen 43, and projects the front image 35 on the front screen 44. It is possible to easily control the optical path of the image light 5 by using the reflection mirror 12 in this manner.

Moreover, the image light 5 reflected by the reflection mirror 12 enters each screen from the inside of the screen unit 13. That is, the reflection mirror 12 projects the front image 35 and the rear image 34 along the optical path through the gap between the rear screen 43 and the front screen 44. Accordingly, it is possible to fit the optical path of the image light 5 inside the image display apparatus 100. As a result, the apparatus configuration can be simplified and the apparatus size can be reduced.

As described above, in the image display apparatus 100, the rear image 34 is projected onto the rear screen 43 and the front image 35 is projected onto the front screen 44 by the emitter 11 and the reflection mirror 12. In this embodiment, a projection unit is realized by the emitter 11 and the reflection mirror 12.

In the rear screen 43, the image light 5 diffused by the transparent screen 40 is reflected by the interface between the transparent base material 30 and the air layer (see FIG. 2A). That is, it can also be said that the rear screen 43 diffuses and reflects the image light 5 for displaying the rear image 34. As a result, the rear image 34 is displayed to the front side of the image display apparatus 100.

Moreover, in the front screen 44, the image light 5 diffused by the transparent screen 40 passes through the transparent base material 30 and is emitted as it is (see FIG. 2A). That is, it can also be said that the front screen 44 diffuses and transmits the image light 5 for displaying the front image 35. As a result, the front image 35 is displayed to overlap with the rear image 34 to the front side of the image display apparatus 100.

FIG. 4 is a schematic diagram showing a display example of the image display apparatus 100. In FIG. 4, the front screen 44 and the rear screen 43 configured in the screen unit 13 are each schematically shown.

In the display example shown in FIG. 4, the front image 35 is a main image 36 and the rear image 34 is a sub-image 37. Here, the main image 36 is, for example, an image that displays main content in image display, and is an image of a main display object 38 such as a person, a character, and a package desired to be mainly displayed.

Moreover, the sub-image 37 is an image to be displayed in association with the main image 36, and for example, is an image that displays a sub-display object 39 such as a shadow and a background of the main display object 38 to be displayed as the main image 36. It should be noted that the above example is merely an example and the main image 36 and the sub-image 37 may be set as appropriate in accordance with the type of content and the like.

In FIG. 4, the main image 36 that displays a person is displayed as the front image 35. In this case, the person is the main display object 38 to be mainly displayed. That is, the front image 35 is the main image 36 that displays the main display object 38. The person who is the main display object 38 is displayed on the front screen 44 on the front side as viewed from the user 2.

Moreover, the sub-image 37 constituted by a pattern of a floral pattern is displayed as the rear image 34. In this case, the pattern of the floral pattern is the sub-display object 39 that is the background of the person who is the main display object 38. That is, the rear image 34 is the sub-image 37 that displays the sub-display object 39 including the background of the main display object 38. The pattern of the floral pattern that is the sub-display object 39 is displayed on the rear screen 43 on the rear side as viewed from the user 2.

For example, an image in which the person (main display object 38) is superimposed on the front of the pattern of the floral pattern (sub-display object 39) is displayed on the screen unit 13. That is, the main image is displayed on the front surface of the screen unit 13 and the image that is the background is displayed on the back surface. By simultaneously displaying the images on the two surfaces of the front screen 44 and the rear screen 43 in this manner, it is possible to perform image display having a stereoscopic sense or a sense of depth due to motion parallax obtained from the difference in depth between the front surface and the back surface. Accordingly, an excellent visual effect can be exhibited.

Moreover, for example, the sub-image 37 that displays the shadow of the main display object 38 or the like may be displayed instead of the background of the main display object 38. In this case, the shadow of the main display object 38 is the sub-display object 39 and the rear image 34 is the sub-image 37 that displays the sub-display object 39 including the shadow of the main display object 38. For example, in a state in which the person is displayed on the front screen 44, the shadow of the person is displayed on the rear screen 43. Accordingly, it becomes easy to recognize the motion parallax due to the difference in depth between the front surface and the back surface, and it is possible to perform image display in which the sense of depth or the like is emphasized. As a matter of course, the sub-image 37 including both the shadow and the background may be displayed.

In this embodiment, the display parameters of the sub-image 37 are controlled by the display control unit 25 in accordance with the display state of the main image 36. Here, the display state of the main image 36 is a state such as luminance, resolution, and saturation in a case of displaying the main image 36, for example. The display state of the main image 36 can change depending on the type of the main image 36, the progress state of the content, and the like, for example. The display parameters of the sub-image 37 are controlled as appropriate in accordance with the change in display state.

For example, when a bright sub-image 37, a clear sub-image 37, or the like is displayed at the back of the main image 36 displayed on the front surface, the main image 36 displayed on the front surface may be obstructed. Therefore, the main image 36 displayed on the front surface can be made conspicuous by making the sub-image 37 displayed on the back surface inconspicuous, for example. In another aspect, it is possible to maintain the display quality of the main image 36 and display a high-quality image by changing the luminance or the like of the sub-image 37 in accordance with the display state of the main image 36.

The display parameters of the sub-image 37 include the luminance, resolution, and saturation of the sub-image 37. For example, it is assumed that the front image 35 is the main image 36 and the rear image 34 is the sub-image 37, as shown in FIG. 4. For example, the luminance of the sub-image 37 displayed behind the main image 36 is set to be relatively darker. Accordingly, the main image 36 can be displayed brightly, and the main content can be emphasized.

Moreover, for example, the resolution of the sub-image 37 is set to be relatively lower. Accordingly, it is possible to display the rough sub-image 37 behind the detailed main image 36. As a result, it is possible to give perspective by blurring the sub-image 37 while clearly displaying the main image 36.

Moreover, for example, the saturation of the sub-image 37 is set to be relatively lower. Accordingly, it is possible to emphasize the color display of the main image 36 while reducing the saturation of the sub-image 37. As a result, it is possible to make the sub-image 37 inconspicuous while clearly displaying the main image 36.

As described above, in this embodiment, two images (main image 36 and sub-image 37) different from each other are displayed, and the display of the sub-image 37 is controlled not to impair the image quality of the main image 36. Accordingly, it is possible to display the main content with a sense of depth, which is excellent in visibility.

It should be noted that the present technology is not limited to the above-mentioned example, and for example, the display parameters of the main image 36 and the sub-image 37 may be adjusted as appropriate. For example, in a case where the main image 36 is not desired to be emphasized, processing of increasing the luminance of the sub-image 37 or lowering the luminance of the main image 36 is performed. In addition, each display parameter may be controlled as appropriate to enable desired display to be performed.

Moreover, in this embodiment, the display control unit 25 controls the size and the display speed of the sub-display object 39 to obtain the motion parallax with respect to the main display object 38. Accordingly, it is possible to realize image display in which the sense of depth and the stereoscopic sense are emphasized.

For example, it is assumed that the main display object 38 is displayed on the front screen 44 and the sub-display object 39 such as the background and the shadow is displayed on the rear screen 43. In this case, the perspective can be emphasized and the motion parallax can be easily recognized by reducing the size of the sub-display object 39 on the back surface relative to the main display object 38 on the front surface, for example.

Moreover, for example, it is also possible to display the main display object 38 and the sub-display object 39 using a moving image such as animation. In this case, the perspective can be emphasized and the motion parallax can be easily recognized by setting the moving speed of the sub-display object 39 on the back surface to be lower relative to the main display object 38 on the front surface.

In this manner, the size and the moving speed of the sub-display object 39 are adjusted in order to improve the effect of the stereoscopic sense due to the motion parallax caused by the difference in depth. Accordingly, the user 2 can easily recognize the motion parallax with respect to the main display object 38, and can improve the sense of depth, the stereoscopic sense, and the like of the image display.

It should be noted that in contrast to the example shown in FIG. 4, image display in which the front image 35 is the sub-image 37 and the rear image 34 is the main image 36 may be performed. In this case, for example, a person or the like can be displayed behind the background displayed on the front surface. The stereoscopic sense and the sense of depth can be expressed by blocking the main display object 38 such as the person with a blocker (background or the like) in this manner. For example, such image display may be performed.

Figure 5A:
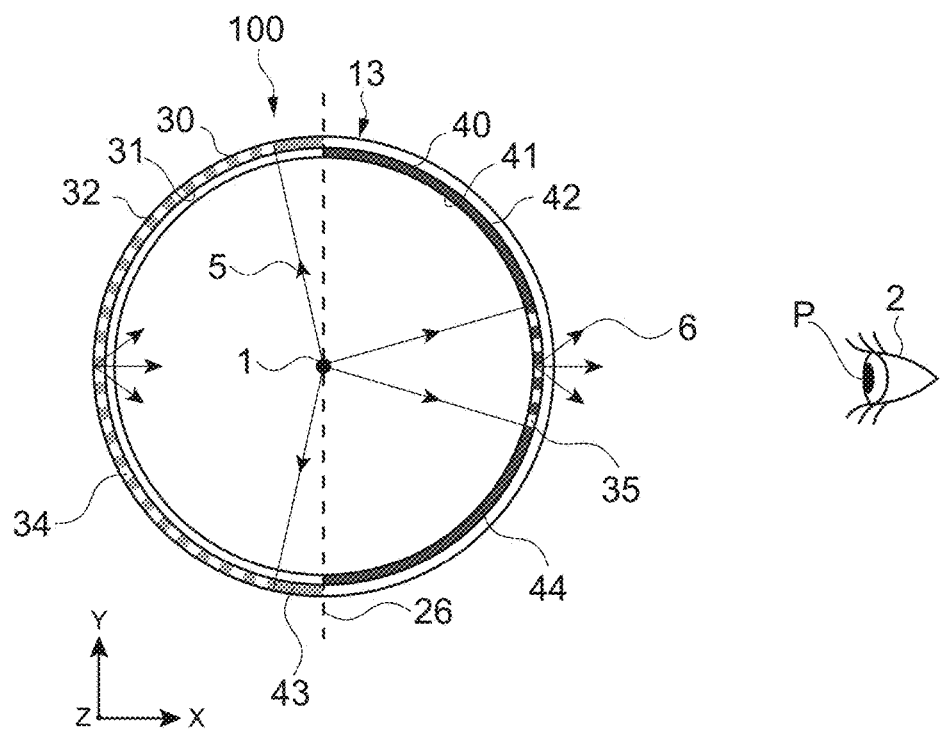
FIGS. 5A and 5B Schematic diagrams showing a case where an observation position of a user moves in FIG. 4.
Figure 5B:
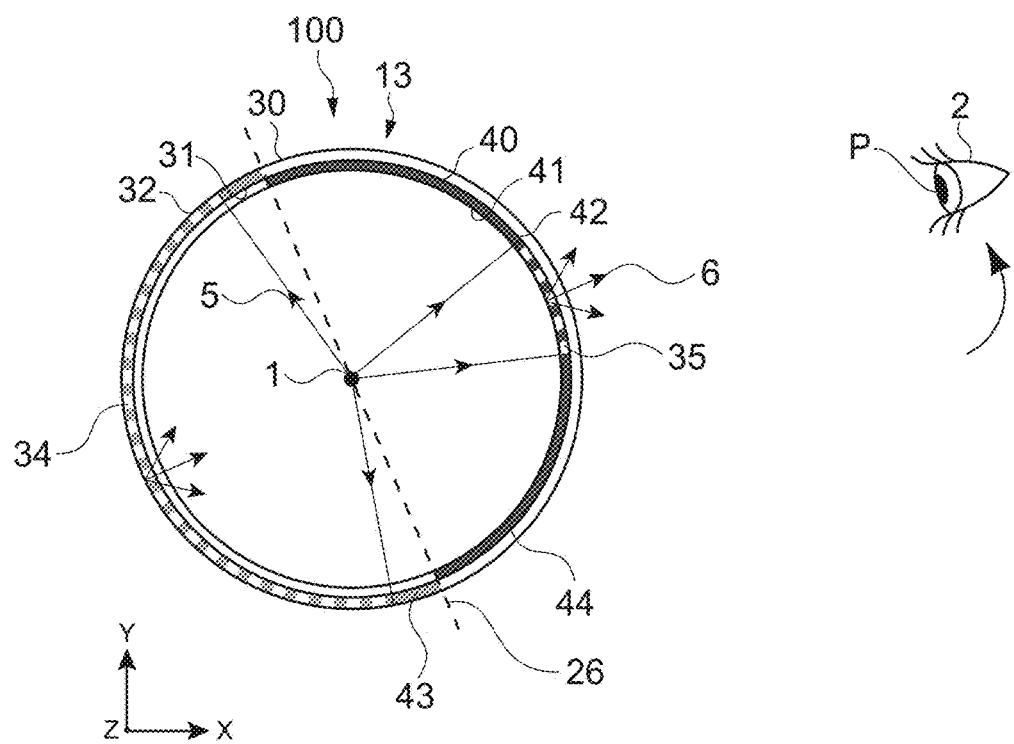

FIGS. 5A and 5B are schematic diagrams showing a case where the observation position of the user 2 is moved in FIG. 4. In each of FIG. 5A and FIG. 5B, a cross section obtained by cutting the screen unit 13 in the XY plane direction is schematically shown. Moreover, in FIGS. 5A and 5B, a boundary plane 26 that is a boundary between the front side and the rear side of the screen unit 13 as viewed from the user 2 is schematically shown as the black dotted line.

In this embodiment, the display control unit 25 controls the display of the front image 35 and the rear image 34 in accordance with the observation position P of the user 2. Specifically, the display positions (projection positions) of the front image 35 and the rear image 34 are controlled in accordance with the observation position P of the user 2. The display position of each image can be controlled by changing the positions of the front image 35 and the rear image 34 in the image data output to the emitter 11 as appropriate, for example.

The display position of the rear image 34 is controlled to be projected to a position on the rear screen 43 as viewed from the observation position P. Moreover, the display position of the front image 35 is controlled to be projected to a position on the front screen 44 as viewed from the observation position P. It should be noted that the relative positional relationship between the rear image 34 and the front image 35 is maintained.

That is, the display control unit 25 controls the display positions of the rear image 34 and the front image 35 such that the relative positional relationship between the rear image 34 and the front image 35 does not change in conjunction with the observation position P. As a result, even when the user 2 moves, the user 2 can view an image similar to the image before movement.

For example, the user 2 is viewing the screen unit 13 from the X direction in FIG. 5A. The azimuth of an observation position P1 is, for example, the same azimuth as the observation position P of the user 2 shown in FIG. 1B. In this case, the boundary plane 26 between the front side and the rear side of the screen unit 13 is a YZ plane including the reference axis 1. Moreover, the semi-cylindrical rear screen 43 is formed on the rear side (left side in the figure) of the boundary plane 26 and the semi-cylindrical front screen 44 is formed on the front side (right side in the figure). In FIG. 5A, the rear screen 43 is schematically shown as the light gray area and the front screen 44 is schematically shown as the dark gray area.

The display control unit 25 generates image data such that the rear image 34 and the front image 35 are respectively displayed on the rear screen 43 and the front screen 44 visible from the observation position P1. In FIG. 5A, the rear image 34 displayed on the rear screen 43 and the front image 35 displayed on the front screen 44 are schematically shown as the white dotted lines.

In FIG. 5B, the user 2 is viewing the screen unit 13 from an observation position P2 rotated in a circumferential direction about the reference axis 1 from the state shown in FIG. 5A. The boundary plane 26 after movement is, for example, a plane obtained by rotating the boundary plane 26 before movement at an angle equivalent to the amount of change (amount of rotation) in the azimuth of the observation position P about the reference axis 1. The rear screen 43 is formed on the rear side and the front screen 44 is formed on the front side with the boundary plane 26 interposed therebetween.

The display control unit 25 generates image data such that the rear image 34 and the front image 35 are respectively displayed on the rear screen 43 and the front screen 44 visible from an observation position P2. Accordingly, the user 2 can visually recognize an image similar to the image that the user 2 has viewed at the observation position P1.

In this manner, the observation position P is detected by the function of detecting the position of the user 2, and the position of the displayed image is changed corresponding to it. Accordingly, it is possible to display an image with a sense of depth over the entire circumference of the image display apparatus 100. As a result, it is possible to greatly widen the angle range (viewing angle) enabling the image display apparatus 100 to properly display an image. As a result, it is possible to display an image with a sense of depth at a sufficiently wider viewing angle.

Figure 6:
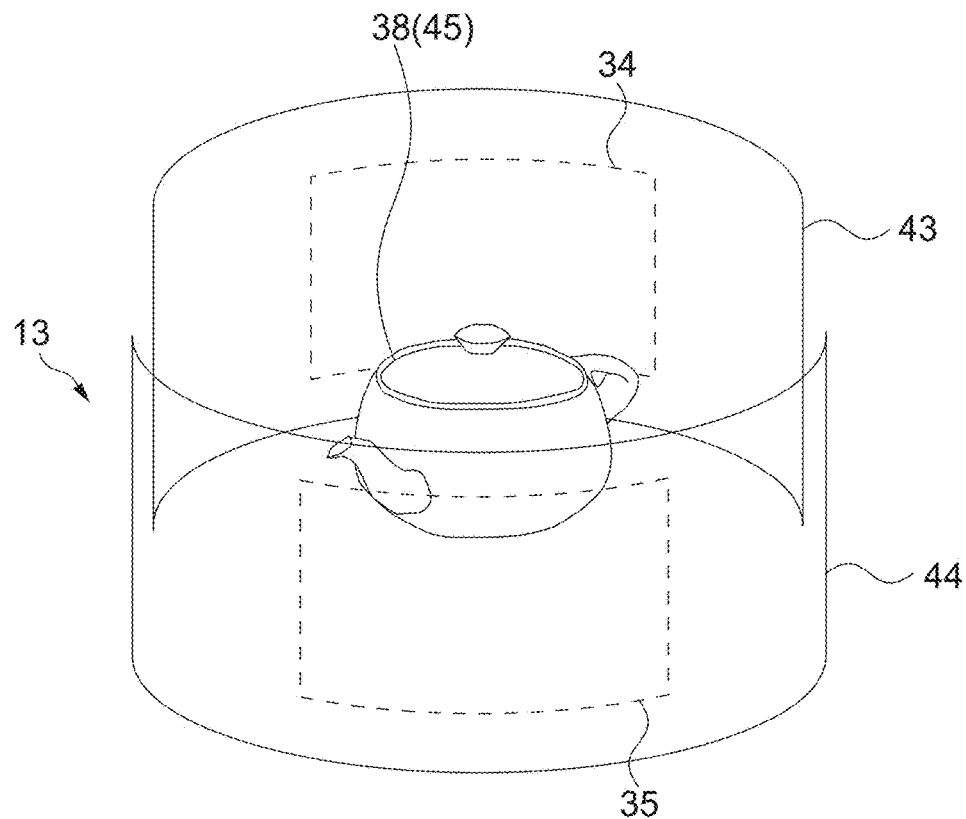
FIG. 6A schematic diagram showing another display example of the image display apparatus.

FIG. 6 is a schematic diagram showing another display example of the image display apparatus 100. In FIG. 6, an example of depth-fused-3D (DFD) display for realizing stereoscopic vision using planar images is schematically shown. The DFD is a method of realizing stereoscopic vision by presenting a depth.

In the DFD display, two transparent planar images (2D images or the like) are superimposed on each other in a front-rear direction in the field of view of the user 2. Specifically, two-dimensional images of the main display object 38 projected in a line-of-sight direction of the user 2 are displayed on the two surfaces of the rear screen 43 and the front screen 44. In the example shown in FIG. 6, a tea pot is shown as the main display object 38 that is a stereoscopic vision object.

In this embodiment, the display control unit 25 generates the projected image of the main display object 38 onto the rear screen from the observation position P as the rear image 34. Moreover, a projected image of the main display object 38 onto the front screen from the observation position P is generated as the front image 35. The display control unit 25 generates the front image 35 and the rear image 34 in accordance with the observation position P on the basis of information about the tea pot stored as the display data 23, for example.

As described above, in the DFD display, both the front image 35 and the rear image 34 are images for displaying the main display object. It should be noted that in FIG. 6, the front image 35 and the rear image 34 are schematically shown as the dotted-line frames. In practice, an image of the tea pot (main display object 38) projected onto each screen is displayed.

The luminance of each of the front image 35 and the rear image 34 is set as appropriate in accordance with depth information of the main display object 38. Accordingly, when viewing the front image 35 displayed on the front surface and the rear image 34 displayed on the back surface, the user 2 may recognize (illusion) the images as one image fused in the depth direction, not as two images. That is, the displayed image is perceived as the stereoscopic vision. Accordingly, it is possible to reproduce a three-dimensional stereoscopic image of the main display object 38.

Figure 7:
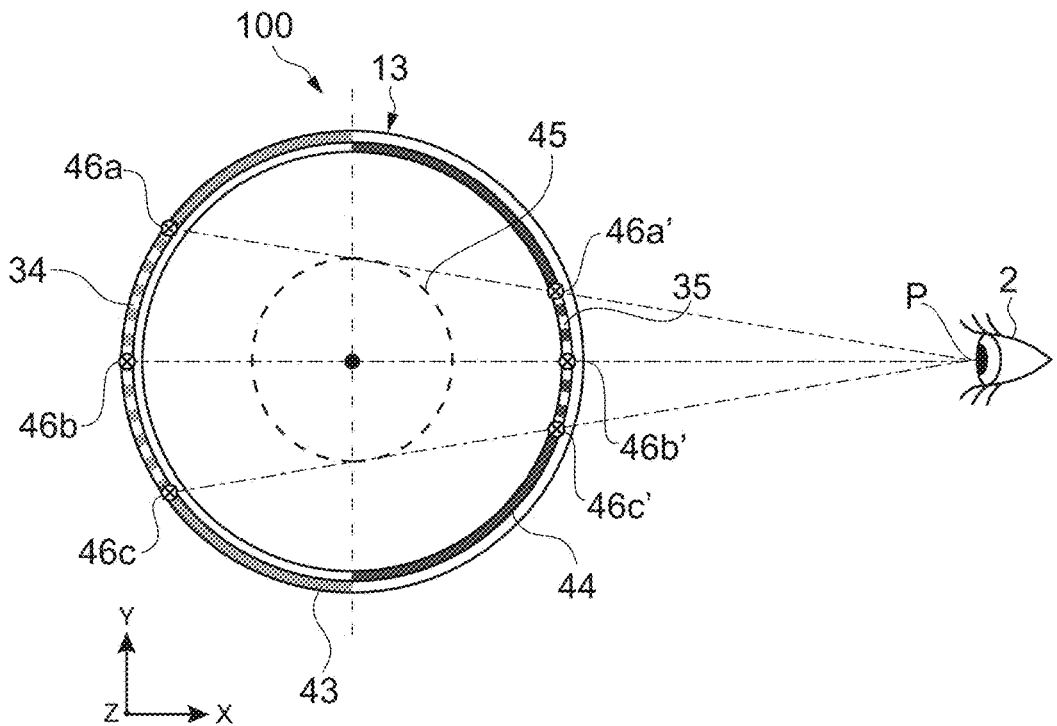
FIG. 7A schematic diagram for describing DFD display.

FIG. 7 is a schematic diagram for describing the DFD display. FIG. 7 shows a cross section of the screen unit 13 cut along the XY plane direction, and a cross section of a stereoscopic image 45 of the main display object 38 (tea pot) is schematically shown as the dotted circle in the center of the screen unit 13. It should be noted that a front surface of the stereoscopic image 45 is actually visualized.

In this embodiment, the display control unit 25 acquires the depth information of the main display object 38 and controls the luminance of the rear image 34 and the front image 35 on the basis of the depth information. The depth information is, for example, data representing the three-dimensional shape of the surface of the main display object 38, and is recorded as display data, for example. For example, point cloud data obtained by measuring the actual object, three-dimensional computer graphics (CG) data, or the like is used as appropriate as the depth information.

For example, the luminance of the front surface (front image 35) and the rear surface (rear image 34) is controlled such that the luminance of the stereoscopic image viewed from the user 2 is constant in accordance with the depth information of the main display object 38. For example, at a point at which the surface of the stereoscopic image 45 is close to the front surface (front screen 44), the luminance of the front image 35 is set to be higher and the luminance of the rear image 34 is set to be lower. Moreover, at a point at which the surface of the stereoscopic image 45 is close to the back surface (rear screen 43), the luminance of the front image 35 is set to be lower, and the luminance of the rear image 34 is set to be higher.

In experiments on the stereoscopic image 45 displayed by the DFD display, the inventors of the present technology have found that a relationship between the depth information of the main display object 38 and the luminance ratio relationship between the front image 35 and the rear image 34 is a substantially linear relationship. That is, in a case where the luminance of the front image 35 and the rear image 34 to be displayed on the front surface and the back surface is set to be the same, it is recognized that the stereoscopic image 45 of the main display object 38 is present substantially in the center between the front screen 44 and the rear screen 43.

In FIG. 7, points 46a to 46c on the rear image 34 and points 46a' to 46b' on the front image 35 are shown. The points 46a and 46a' are both points representing the edge of the main display object 38 on the right side (upper side in the figure) as viewed from the user 2. Moreover, both the points 46b and 46b' are points representing the surface of the main display object 38 displayed in the center as viewed from the user 2. Moreover, the points 46c and 46c' are both points representing the edge of the main display object 38 on the left side (lower side in the figure) as viewed from the user 2.

For example, the left and right edges of the main display object 38 are displayed substantially in the center (e.g., boundary plane 26) between the front screen 44 and the rear screen 43. Therefore, the same luminance is set to the point 46a of the rear image 34 and the point 46a' of the front image 35. In this case, the luminance ratio of the points 46a and 46a' is 50%:50%. Similarly, the luminance ratio of the points 46c and 46c' is also set to 50%:50%.

Moreover, for example, the central portion of the main display object 38 is a surface protruding to the front side. In this case, depending on the ratio (distance) protruding to the front side, the luminance of the point 46b of the rear image 34 is set to be lower and the luminance of the point 46b' of the front image 35 is set to be higher. For example, the luminance ratio of the points 46b and 46b' is set to 40%:60%. As a matter of course, the luminance ratio is set as appropriate depending on the position of the surface of the main display object 38.

It should be noted that as will be described later, in the display control unit 25, the luminance of the front image 35 and the rear image 34 is corrected as appropriate in accordance with the characteristics and the like of the screen unit 13 and the reflection mirror 12. Therefore, the image data actually generated is data including the front image 35 and the rear image 34 with the luminance corrected in accordance with the characteristics of each unit.

Figure 8:
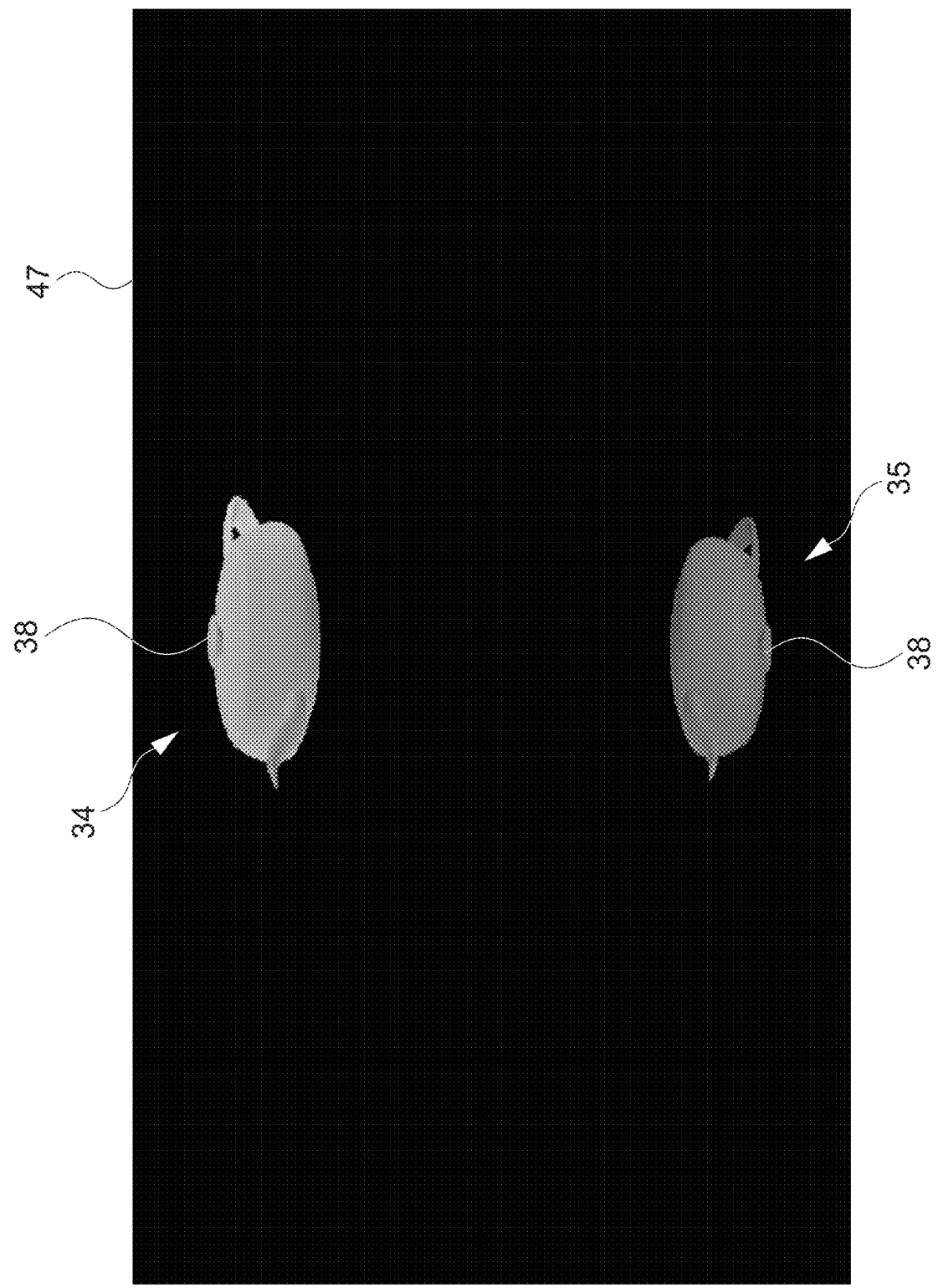
FIG. 8 An image showing an example of image data of the DFD display.

FIG. 8 shows an image showing an example of the image data of the DFD display. Image data 47 is, for example, data output to the emitter 11, and the image light 5 is generated on the basis of the image data 47. The image on the left side of FIG. 8 is the rear image 34 projected onto the rear screen 43 and the image on the right side is the front image 35 projected onto the front screen 44. It should be noted that the black region is a region from which the image light 5 is hardly emitted.

The luminance of the rear image 34 is corrected in accordance with the reflectance of the surface reflection on the rear screen 43 (second surface 32 of the transparent base material 30). That is, the image light 5 that passes through the rear screen 43 and is emitted to the rear side of the screen unit 13 is present, and thus the luminance corrected in view of the amount thereof is set. Moreover, the rear image 34 is displayed on the rear screen 43 which is the concave surface as viewed from the user 2, and thus shape correction is performed in accordance with the cylindrical shape of the concave surface.

The front image 35 is an image projected onto the surface (front screen 44) closer to the user 2 than the rear image 34, and is an image smaller than the rear image 34. Moreover, the front image 35 is displayed on the front screen 44 which is the convex surface as viewed from the user 2, and thus correction processing is performed in accordance with the cylindrical shape of the convex surface.

Thus, the luminance, the shape, and the like of the front image 35 and the rear image 34 are corrected as appropriate in accordance with the characteristics of the screen unit 13 and the like. It should be noted that the luminance of the front image 35 and the rear image 34 before correction is set using the method and the like described with reference to FIG. 7. Accordingly, it is possible to realize high-precision stereoscopic vision in accordance with the characteristics of the image display apparatus 100.

Figure 9A:
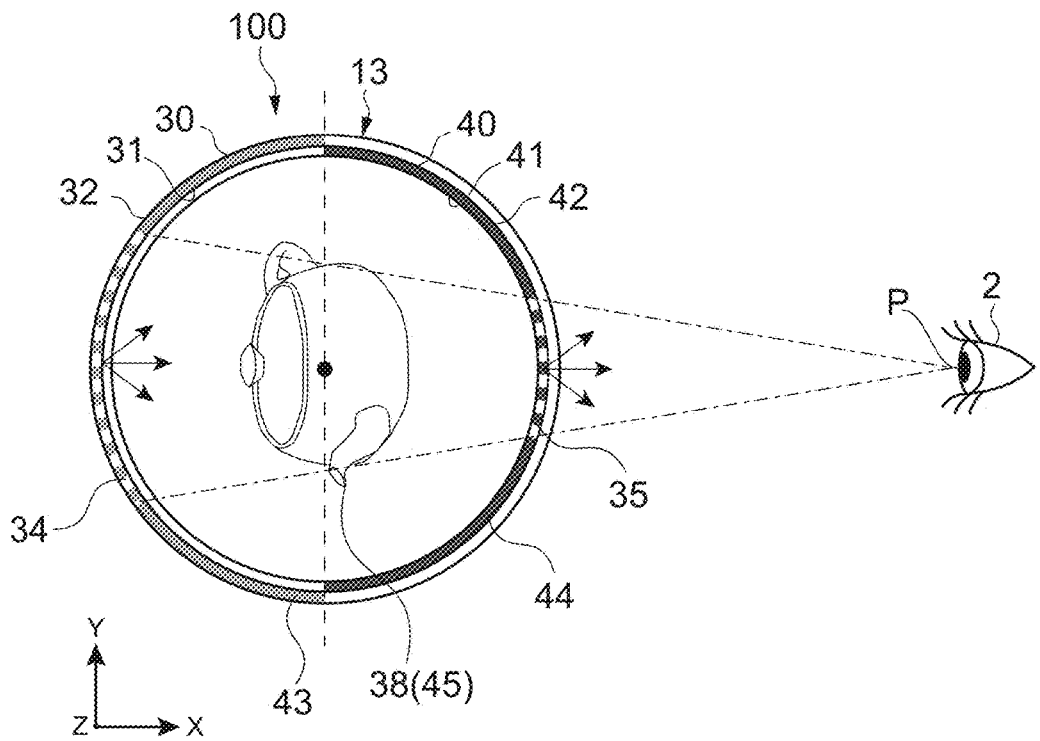
FIGS. 9A and 9B Schematic diagrams showing a case where a viewpoint position of the user moves in the DFD display.
Figure 9B:
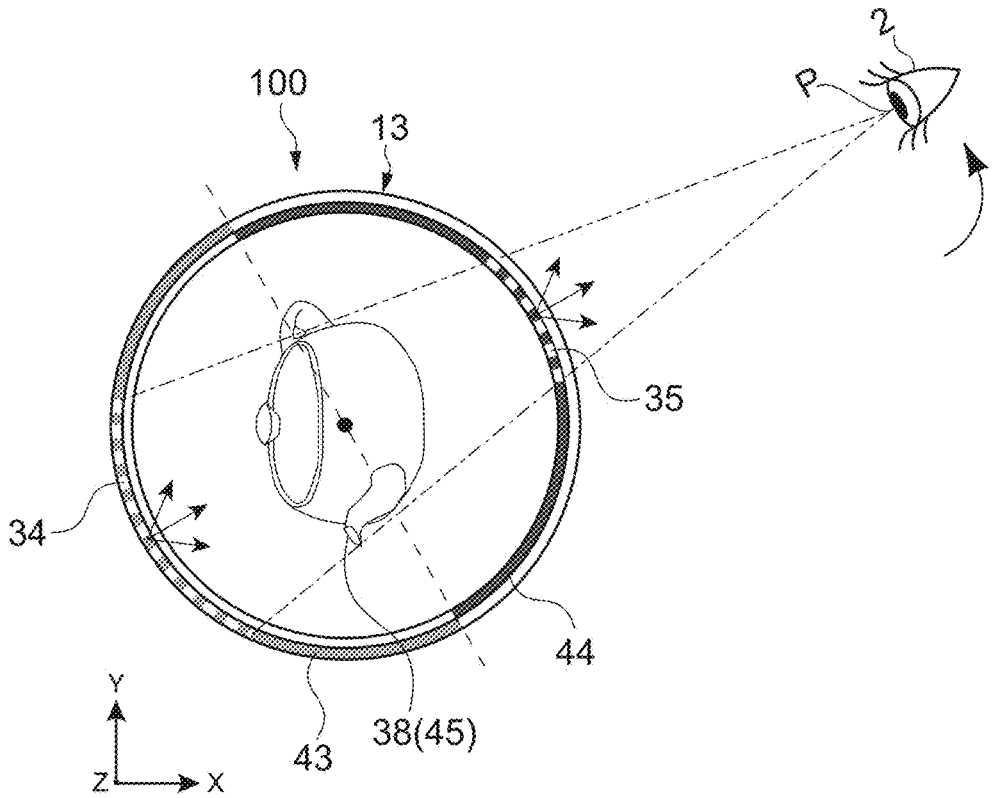

FIGS. 9A and 9B are schematic diagrams showing a case where the viewpoint position of the user moves in the DFD display. In each of FIG. 9A and FIG. 9B, a stereoscopic image of the main display object 38 (tea pot) displayed inside the screen unit 13 is schematically shown. It should be noted that in FIG. 9A, the user 2 is viewing the screen unit 13 in the X direction. Moreover, in FIG. 9B, the observation position P of the user 2 is rotated in the circumferential direction from the state shown in FIG. 9A.

In a case where the DFD display is performed, the display control unit 25 controls the display of the front image 35 and the rear image 34 in accordance with the observation position P of the user 2. For example, it is assumed that the observation position P of the user 2 is rotated in the circumferential direction as shown in FIG. 9B. In this case, for example, the front image 35 and the rear image 34 obtained by projecting the main display object 38 onto the front screen 44 and rear screen 43 from the observation position P after movement anew are generated, respectively.

This projection processing is performed such that the stereoscopic image 45 of the main display object 38 is a state of being fixed to the coordinate system of the image display apparatus 100. That is, the projection processing after movement is, for example, processing of projecting the main display object 38 fixed to the inside of the screen unit 13 from the observation position P after movement. As a result, the stereoscopic image 45 after movement is an image that displays the main display object 38 as viewed in a direction different from the direction before movement.

Accordingly, the user 2 can observe the stereoscopic image of the main display object 38 fixed to the inside of the screen unit 13 in the full azimuth of 360 degrees by going around the screen unit 13 once, for example. It should be noted that the present technology is not limited to the case where the projection processing is performed while the stereoscopic image 45 of the main display object 38 is fixed. For example, it is also possible to enable the same stereoscopic image 45 to be seen irrespective of the azimuth by changing the display positions of the front image 35 and the rear image 34 in conjunction with the azimuth of the observation position P of the user 2 (see FIGS. 5A and 5B).

Moreover, in a case where the observation position P of the user 2 moves away from the screen unit 13 for example, the size of the front image 35 and the rear image 34 is adjusted in accordance with the distance between the observation position P and the screen unit 13 (reference axis 1 or the like). Specifically, the size of the front image 35 (rear image 34) is controlled such that the front image 35 (rear image 34) is a projected image in which the main display object 38 is projected onto the front screen 44 (rear screen 43) from the observation position P after movement. Accordingly, the stereoscopic image 45 can be displayed with high accuracy irrespective of the observation position P.

In this manner, a three-dimensional stereoscopic image is more clearly recognized by adding a mechanism that detects the observation position P of the user 2. In the DFD display, since the two-dimensional images of the main display object 38 projected in the line-of-sight direction of the user 2 are displayed on the front screen 44 and the rear screen 43, the range in which the stereoscopic image 45 can be properly visually recognized may be limited.

In this embodiment, expression can be achieved as if the main display object 38 were present in the cylinder by changing the position on the curved surface for displaying the projected image (front image 35 and rear image 34) and the projected image as appropriate in accordance with the movement when the user 2 moves. Accordingly, stereoscopic vision enabling the main display object 38 to be observed in the full azimuth is realized, for example, and an excellent visual effect can be exhibited.

As described above, in the image display apparatus 100 according to this embodiment, the curved rear screen 43 is disposed along the reference axis 1. The curved front screen 44 having transparency is disposed in front of the rear screen 43 with the gap interposed therebetween. Moreover, the image light 5 for displaying the rear image 34 and the front image 35 superimposed thereon is emitted from the region on the reference axis 1, and the rear image 34 and the front image 35 are projected onto the rear screen 43 and the front screen 44, respectively. Accordingly, the images are displayed in a superimposed manner on the two curved surfaces, and an image with a sense of depth at a wider viewing angle can be displayed.

A method using planar transparent screens is conceivable as the method of displaying an image with a sense of depth. For example, an image with a sense of depth can be displayed by arranging a plurality of transparent screens in parallel and displaying images on the respective screens. On the other hand, in this method, because of the planar screens, it may be difficult to view the stereoscopic vision of the DFD or the like in a wide azimuth, for example. Moreover, it is impossible to widen the diffusion angle in order to make the screen transparent, and thus the viewing positions may be limited.

In this embodiment, the cylindrical rear screen 43 and the cylindrical front screen 44 are used. Accordingly, it is possible to display a stereoscopic image with a sense of depth by superimposing the front image 35 on the rear image 34. Moreover, since each screen is disposed along the cylindrical surface, it is possible to display an image with a sense of depth in a wider angle range, and to realize a wider viewing angle.

Moreover, in this embodiment, the observation position P of the user 2 is detected, and the display of the rear image 34 and the front image 35 is controlled in accordance with the observation position P. As a result, for example, it is possible to display an image with a sense of depth and a stereoscopic sense over the entire circumference of the cylindrical screen unit 13, and to sufficiently widen the viewing angle.

For example, even in a case where stereoscopic display is performed in accordance with the observation position P of the DFD display or the like, the stereoscopic image can be properly displayed over the entire circumference irrespective of the observation position P of the user 2. Excellent visual effects such as a sense of reality and a sense of float, which cannot be provided with a two-dimensional image, can be exhibited by performing three-dimensional display in this manner.

Moreover, in this embodiment, the optical systems such as the emitter 11 and the reflection mirror 12 are disposed along the reference axis 1 inside of the cylindrical screen unit 13. Accordingly, it is possible to realize miniaturization of the apparatus. It is also possible to simplify the apparatus configuration. For example, as compared to a configuration in which an image is projected onto a plurality of screens by the use of a plurality of projectors or the like, the adjustment of the optical systems are greatly simplified and maintenance and the like can be easily performed.

Second Embodiment

An image display apparatus according to a second embodiment of the present technology will be described. Hereinafter, descriptions of those similar to the configurations and actions of the image display apparatus 100 described in the above-mentioned embodiment will be omitted or simplified.

Figure 10A:
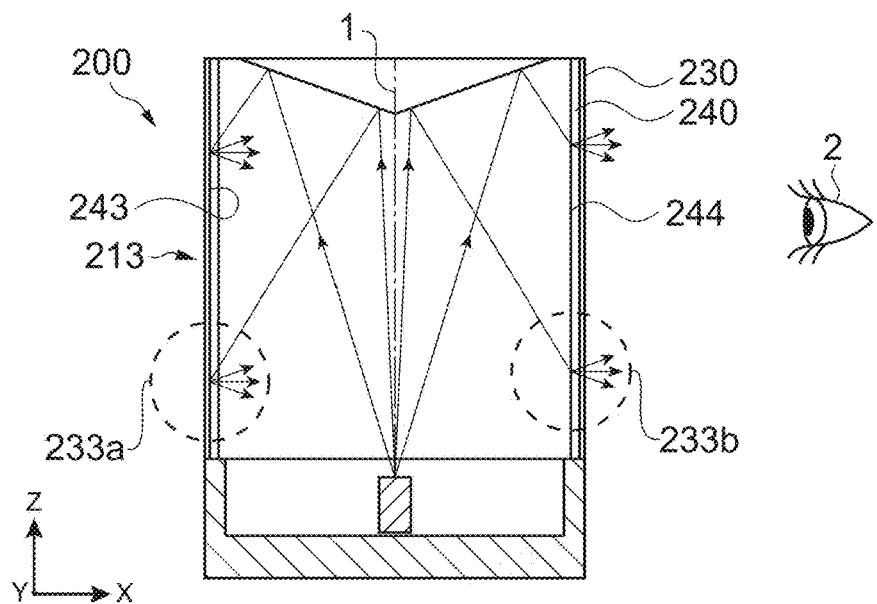
FIGS. 10A, 10B, and 10C Schematic diagrams showing a configuration example of an image display apparatus according to a second embodiment.
Figure 10B:
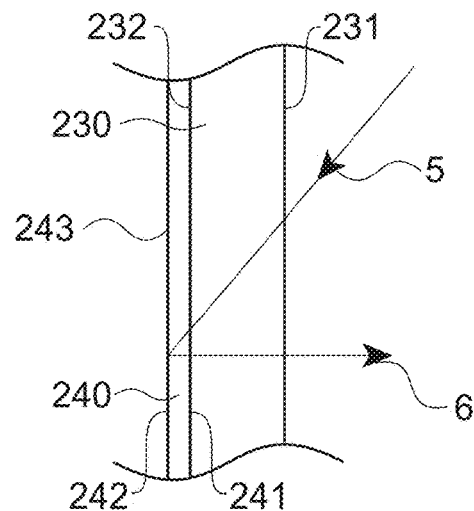
Figure 10C:
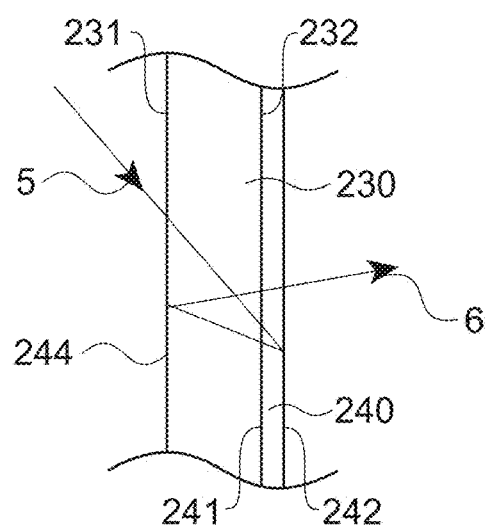

FIGS. 10A, 10B and 10C are schematic diagrams showing a configuration example of the image display apparatus according to the second embodiment. FIG. 10A is a schematic cross-sectional view of an image display apparatus 200. The image display apparatus 200 includes a screen unit 213 that is a transparent cylindrical screen. The screen unit 213 includes a tubular transparent base material 230 having a circular cylindrical surface and a transparent screen 240 disposed on the outer surface of the transparent base material 230.

The transparent base material 230 has a first surface 231 that is an inner circumferential surface and a second surface 232 that is an outer circumferential surface. The transparent screen 240 has a third surface 241 that is an inner circumferential surface and a fourth surface 242 that is an outer circumferential surface. Moreover, the transparent screen 240 is disposed outside the transparent base material 230 such that the third surface 241 is held in contact with the second surface 232 of the transparent base material 230.

A screen using a reflective hologram (reflective HOE) is configured as the transparent screen 240. The reflective HOE has a function of reflecting and diffusing light entering at a predetermined angle of incidence θ. Therefore, image light 5 entering the third surface 241 of the transparent screen 240 is diffracted by interference fringes in the transparent screen 240 and is emitted from the third surface 241 as diffuse light 6.

FIG. 10B shows an example of the optical path of the image light 5 entering the rear side (left side in the figure) of the screen unit 213 as viewed from a user 2 and is an enlarged view of a dotted-line region 233a shown in FIG. 10A. The image light 5 emitted to the rear side of the screen unit 213 enters the first surface 231 inside the transparent base material 230, passes through the outer second surface 232, and enters the third surface 241 of the transparent screen 240.

The image light 5 entering the third surface 241 undergoes diffraction due to interference fringes while traveling to the fourth surface 242. Then, the image light 5 is emitted as the diffuse light 6 from the third surface 241. Part of the diffuse light 6 passes through the transparent base material 230 and travels toward the user 2. As a result, a rear screen 243 that displays an image toward the user 2 is formed on the fourth surface 242, for example.

FIG. 10C shows an example of the optical path of the image light 5 entering the front side (right side in the figure) of the screen unit 213 as viewed from the user 2 and is an enlarged view of a dotted-line region 233b shown in FIG. 10A. The image light 5 emitted to the front side of the screen unit 213 enters the first surface 231 inside the transparent screen 240, passes through the outer second surface 232, and enters the third surface 241 of the transparent screen 240.

The image light 5 entering the third surface 241 is emitted to the rear side from the third surface 241 as the diffuse light 6. Part of the diffuse light 6 to the rear side is reflected by the first surface 231, which is an interface between the transparent base material 230 and the air layer, and is emitted to the front side. That is, the first surface 231 is a reflection surface that reflects the diffuse light 6.

The diffuse light 6 reflected by the first surface 231 passes through the transparent base material 230 and the transparent screen 240 and travels toward the user. Thus, in this embodiment, the image light 5 (diffuse light 6) is reflected to the outside of the screen unit 213 by using surface reflection that occurs due to the difference in refractive index between the transparent base material 230 that is an inner surface of the screen unit 213 and the air layer. As a result, a front screen 244 that displays an image toward the user 2 is formed on the first surface 231.

Thus, in this embodiment, the transparent screen 240 is a reflective screen disposed on the outer surface of the transparent base material 230. In this case, the rear screen 243 is formed on the reflective screen (transparent screen 240) and the front screen 244 is formed on an inner surface (first surface 231) of the transparent base material 230. That is, the rear screen 243 is a reflective transparent screen located relatively outside in the screen unit 213 and the front screen 244 is a reflection surface located relatively inside.

Even in a case where the reflective transparent screen 240 is disposed on the outer surface of the transparent base material 230, a semi-cylindrical rear screen 243 and a front screen 244 are each configured. Accordingly, an image with a sense of depth at a wider viewing angle can be displayed.

Third Embodiment

Figure 11A:
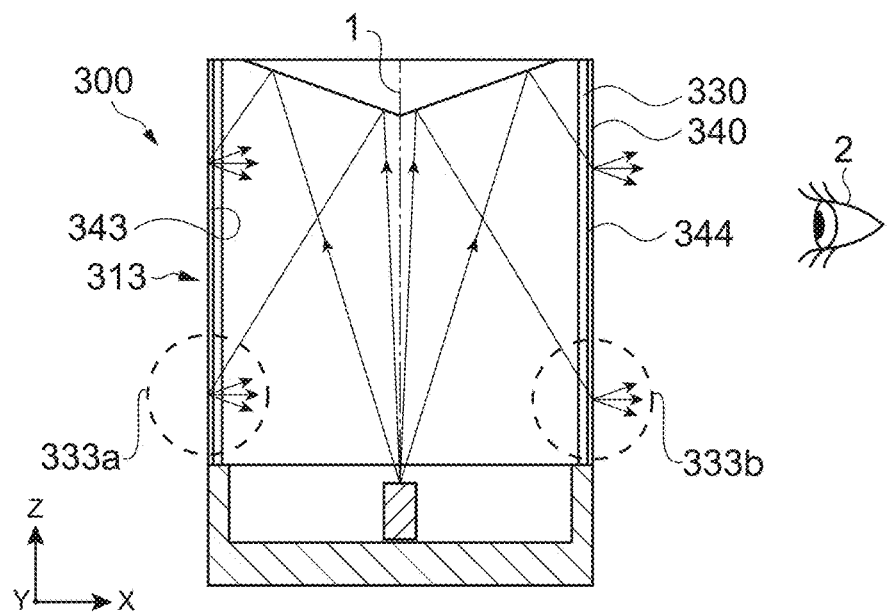
FIGS. 11A, 11B, and 11C Schematic diagrams showing a configuration example of an image display apparatus according to a third embodiment.
Figure 11B:
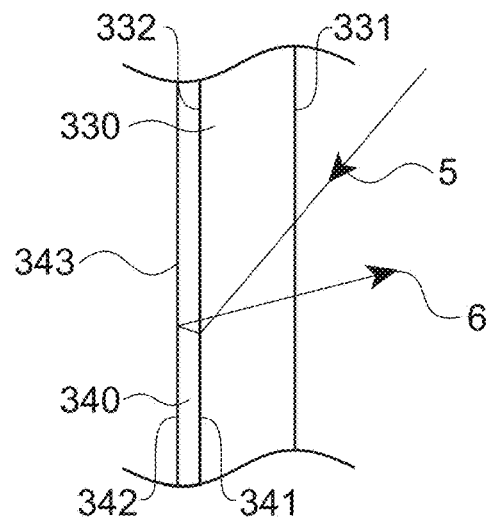
Figure 11C:
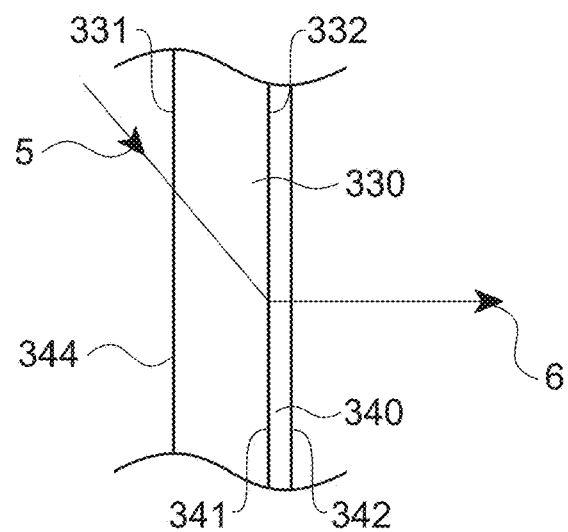

FIGS. 11A, 11B and 11C are schematic diagrams showing a configuration example of an image display apparatus according to a third embodiment. FIG. 11A is a schematic cross-sectional view of an image display apparatus 300. The image display apparatus 300 has a screen unit 313 that is a transparent cylindrical screen. The screen unit 313 includes a tubular transparent base material 330 having a circular cylindrical surface and a transparent screen 340 disposed on an outer surface of the transparent base material 330. In this embodiment, the transparent screen 340 is a transmissive screen.

FIG. 11B shows an example of the optical path of image light 5 entering the rear side (left side in the figure) of the screen unit 313 as viewed from a user 2 and is an enlarged view of a dotted-line region 333a shown in FIG. 11A. The image light 5 emitted to the rear side of the screen unit 313 enters a first surface 331 inside the transparent base material 330, passes through an outer second surface 332, and enters the third surface 341 inside the transparent screen 340.

The image light 5 entering the third surface 341 is diffracted by interference fringes to be the diffuse light 6 and travels toward a fourth surface 342 outside the transparent screen 340. Part of the diffuse light 6 is reflected on the fourth surface 342, which is an interface between the transparent screen 340 and the air layer, and is emitted to the front side. That is, the fourth surface 342 is a reflection surface that reflects the diffuse light 6. The reflected diffuse light 6 passes through the transparent base material 330 and travels toward the user 2. As a result, a rear screen 343 that displays an image toward the user 2 is formed on the fourth surface 342.

FIG. 10C shows an example of the optical path of the image light 5 entering the front side (right side in the figure)

of the screen unit 313 as viewed from the user 2 and is an enlarged view of a dotted-line region 333*b* shown in FIG. 10A. The image light 5 emitted to the front side of the screen unit 313 enters the first surface 331 inside the transparent base material 330, passes through the outer second surface 332, and enters the third surface 341 of the transparent screen 340.

The image light 5 entering the third surface 341 is emitted to the front side from the fourth surface 342 as the diffuse light 6. As a result, a front screen 344 that displays an image toward the user 2 is formed on the third surface 341, for example. It should be noted that part of the diffuse light 6 to the front side is reflected by the fourth surface 342, which is an interface between the transparent screen 340, and the air layer, and is emitted to the rear side.

Thus, in this embodiment, the transparent screen 340 is a transmissive screen disposed on the outer surface of the transparent base material 330. In this case, the rear screen 343 is formed on the outer surface (fourth surface 342) of the transparent screen 340 and the front screen 344 is formed on the transmissive screen (transparent screen 340).

Even in a case where the transmissive transparent screen 340 is disposed on the outer surface of the transparent base material 330, a semi-cylindrical rear screen 343 and a front screen 344 are each configured. Accordingly, an image with a sense of depth at a wider viewing angle can be displayed.

Fourth Embodiment

Figure 12A:
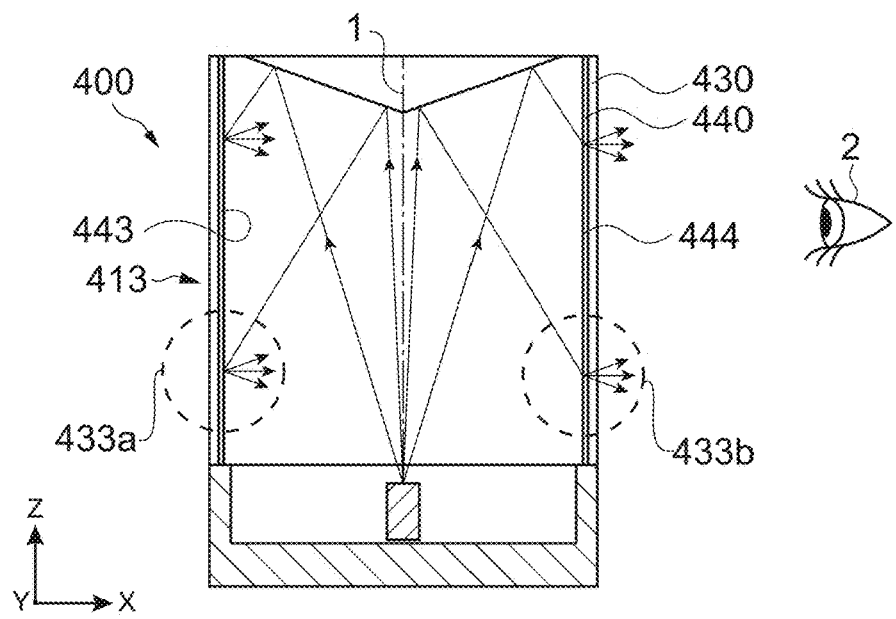
FIGS. 12A, 12B, and 12C Schematic diagrams showing a configuration example of an image display apparatus according to a fourth embodiment.
Figure 12B:
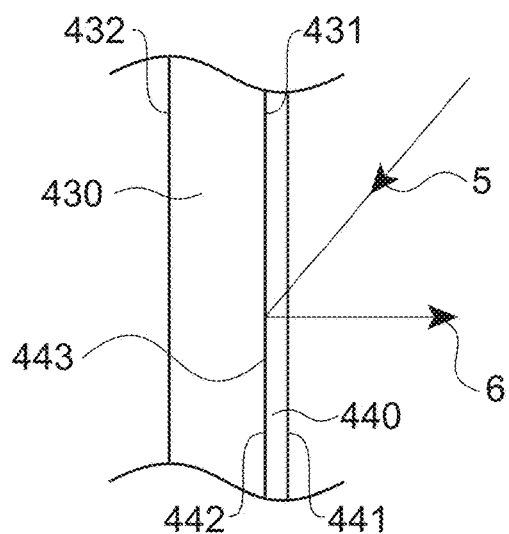
Figure 12C:
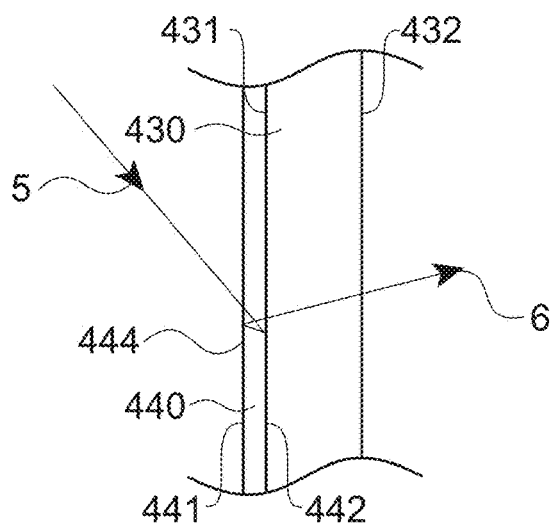

FIGS. 12A, 12B and 12C are schematic diagrams showing a configuration example of the image display apparatus according to a fourth embodiment. FIG. 12A is a schematic cross-sectional view of an image display apparatus 400. The image display apparatus 400 includes a screen unit 413 that is a transparent cylindrical screen. The screen unit 413 has a tubular transparent base material 430 having a circular cylindrical surface and a transparent screen 440 disposed on the inner surface of the transparent base material 430. In this embodiment, the transparent screen 440 is a reflective screen.

FIG. 12B shows an example of the optical path of image light 5 entering the rear side (left side in the figure) of the screen unit 413 as viewed from a user 2 and is an enlarged view of a dotted-line region 433*a* shown in FIG. 12A. The image light 5 emitted to the rear side of the screen unit 413 enters a third surface 441 inside the transparent screen 440. The image light 5 entering the third surface 441 undergoes diffraction due to interference fringes while traveling to a fourth surface 442. Then, the image light 5 is emitted from the third surface 441 as diffuse light 6. As a result, a rear screen 443 that displays an image toward the user 2 is formed on the fourth surface 442, for example.

FIG. 12C shows an example of the optical path of the image light 5 entering the front side (right side in the figure) of the screen unit 413 as viewed from the user 2 and is an enlarged view of a dotted-line region 433*b* shown in FIG. 12A. The image light 5 emitted to the front side of the screen unit 413 enters the third surface 441 inside the transparent screen 440, and is diffracted by the interference fringes to be diffuse light 6 traveling to the third surface 441 (rear side) while traveling to the fourth surface 442.

The diffuse light 6 traveling to the rear side is reflected by the third surface 441, which is an interface between the transparent screen 440 and the air layer, and is emitted to the front side. That is, the third surface 441 is a reflection surface that reflects the diffuse light 6. The reflected diffuse light 6 passes through the transparent base material 430 and is emitted to the front side. As a result, a front screen 444 that displays an image toward the user 2 is formed on the third surface 441. It should be noted that part of the diffuse light 6 directed to the rear side passes through the third surface 441 and is emitted to the rear side.

Thus, in this embodiment, the transparent screen 440 is a reflective screen disposed on the inner surface of the transparent base material 430. In this case, the rear screen 443 is formed on a reflective screen (transparent screen 440) and the front screen 444 is formed on an inner surface (third surface 441) of the transparent screen 440.

Even in a case where the reflective transparent screen 440 is disposed on the inner surface of the transparent base material 430, a semi-cylindrical rear screen 443 and a front screen 444 are respectively configured. Accordingly, an image with a sense of depth at a wider viewing angle can be displayed.

Fifth Embodiment

Figure 13:
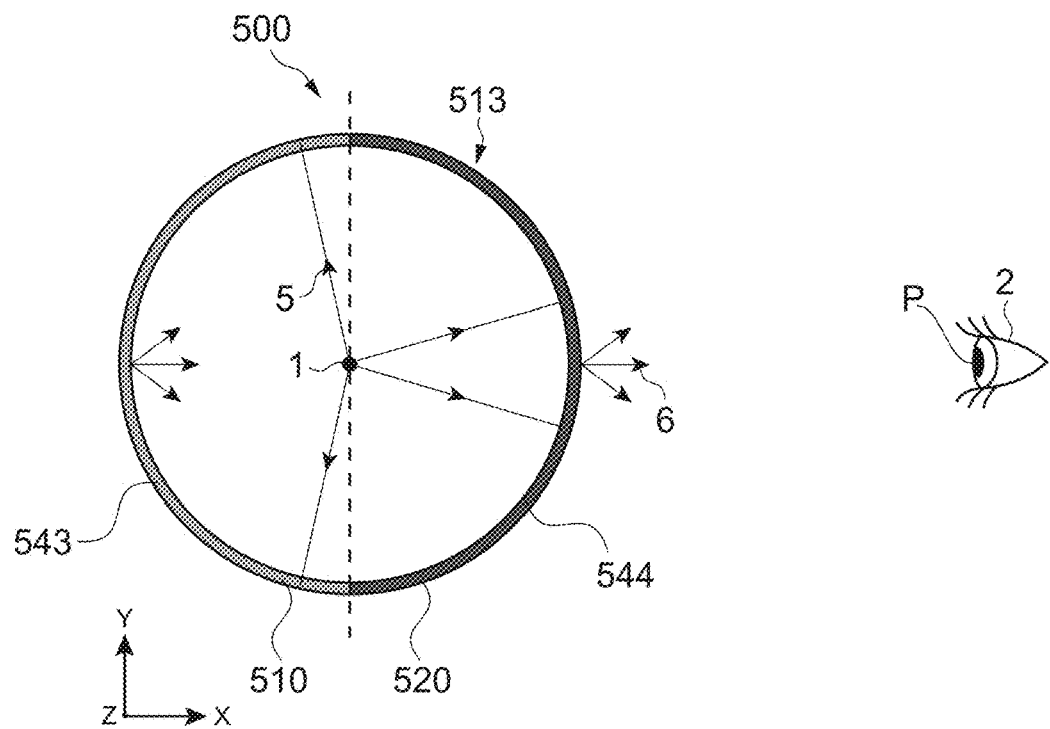
FIG. 13A cross-sectional view showing a configuration example of an image display apparatus according to a fifth embodiment.

FIG. 13 is a cross-sectional view showing a configuration example of an image display apparatus according to a fifth embodiment. In FIG. 13, a cross section of a screen unit 513 in the XY plane direction as an image display apparatus 500 is viewed from above is schematically shown. In this embodiment, the screen unit 513 in which a transmissive screen 520 is disposed on the front half surface and a reflective screen 510 is disposed on the remaining half surface is configured.

The screen unit 513 has a cylindrical shape having a reference axis 1 as a central axis. The reflective screen 510 is disposed on one side and the transmissive screen 520 is disposed on the other side across a plane (dotted line in the figure) including the reference axis 1.

The reflective screen 510 is a semi-cylindrical transparent screen and has a function of diffusing and reflecting image light 5 entering at a predetermined angle of incidence θ. The transmissive screen 520 is a semi-cylindrical transparent screen and has a function of diffusing and transmitting image light 5 entering at the predetermined angle of incidence θ.

The reflective screen 510 is configured by disposing a reflective HOE on a half surface of a cylindrical transparent base material (not shown), for example. Moreover, the transmissive screen 520 is configured by disposing a transmissive HOE on a half surface of the transparent base material on the opposite side to the reflective screen 510.

In the image display apparatus 500, the image light 5 is projected toward the reflective screen 510 and the transmissive screen 520 from the inside of the screen unit 513. The image light 5 entering the reflective screen 510 is reflected by the reflective screen 510 and is emitted toward the transmissive screen 520 on the opposite side as diffuse light 6. The image light 5 traveling toward the transmissive screen 520 passes through the transmissive screen 520 and is emitted to the outside of the screen unit 513.

Moreover, the image light 5 entering the transmissive screen 520 passes through the transmissive screen 520 and is emitted to the outside of the transmissive screen 520 (screen unit 513) as the diffuse light 6. Thus, in this embodiment, the reflective screen 510 functions as a rear screen 543 and the transmissive screen 520 functions as a front screen 544. Moreover, the side on which the transmissive screen 520 is provided is the front side of the image display apparatus 500.

For example, the user 2 viewing the screen unit 513 from the side on which the transmissive screen 520 is provided can visually recognize the front image projected onto the transmissive screen 520, the front image being superimposed on the front of the rear image projected onto the reflective screen 510.

As described above, the screen unit 513 has the curved reflective screen 510 and the curved transmissive screen 520 that are disposed a the gap interposed therebetween. In the screen unit 513, the rear screen 543 is formed by the reflective screen 510 and the front screen 544 is formed by the transmissive screen 520. Thus, it is possible to increase the amount of light of the image light 5 (diffuse light 6) emitted toward the user 2 by using the reflective screen 510 and the transmissive screen 520. As a result, it is possible to realize a bright image with a sense of depth at a wider viewing angle, and to improve the visibility.

Sixth Embodiment

Figure 14:
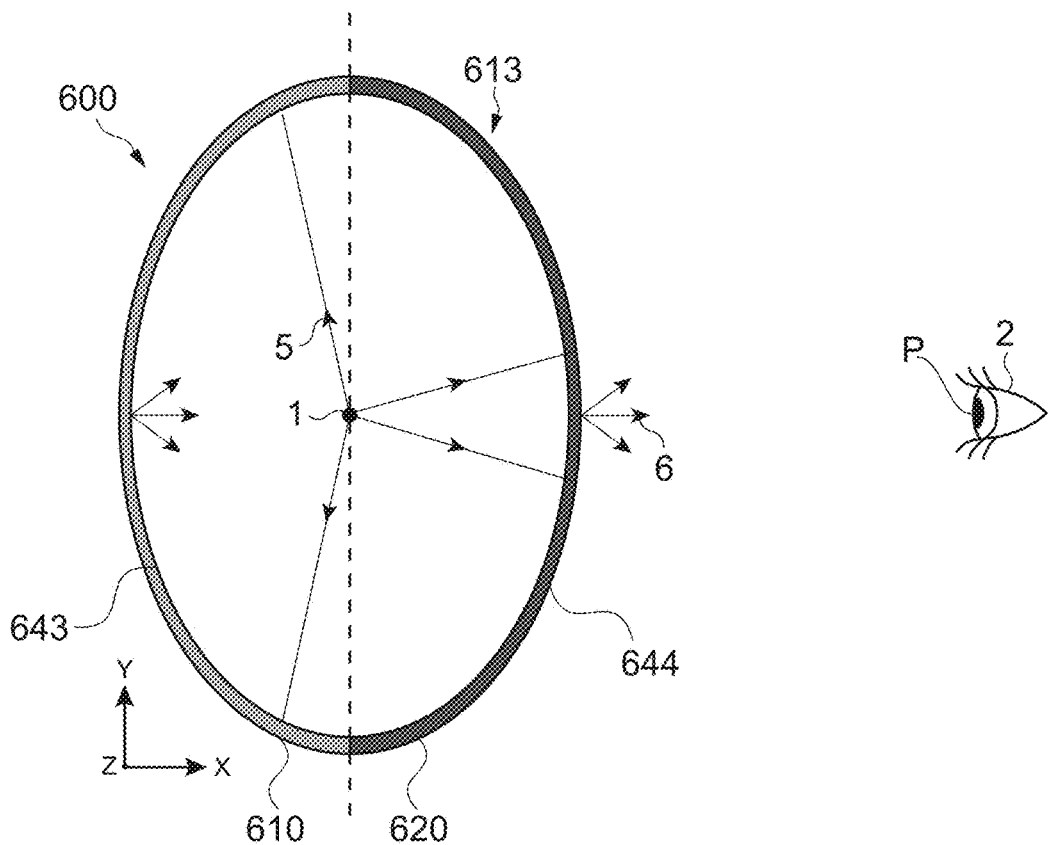
FIG. 14A cross-sectional view showing a configuration example of an image display apparatus according to a sixth embodiment.

FIG. 14 is a cross-sectional view showing a configuration example of an image display apparatus according to a sixth embodiment. In FIG. 14, a cross section of a screen unit 613 in the XY plane direction as an image display apparatus 600 is viewed from above is schematically shown. In this embodiment, the screen unit 613 having a cylindrical shape (elliptical cylindrical shape) whose side surface is an elliptical cylindrical surface is configured.

As shown in FIG. 14, the cross section of the screen unit 613 in the XY plane direction is elliptical. Moreover, an axis extending through the center of the elliptical shape and parallel to the up-and-down direction (Z direction) is a reference axis 1 of the screen unit 613.

Moreover, a reflective screen 610 is disposed on one side and a transmissive screen 620 is disposed on the other side across a plane (dotted line in the figure) including a major axis direction of the elliptical shape and the reference axis 1. Thus, it can also be said that the screen unit 613 shown in FIG. 14 has a configuration obtained by deforming the cylindrical screen unit 513 described with reference to FIG. 13 into an elliptical cylindrical shape.

In the image display apparatus 700, the reflective screen 610 and the transmissive screen 620 are elliptical cylindrical surfaces. The reflective screen 610 functions as a rear screen 643 and the transmissive screen 620 functions as a front screen 644. Thus, the rear screen 643 and the front screen 644 are elliptical cylindrical surfaces having the reference axis 1 as a central axis. It should be noted that the side on which the transmissive screen 620 is provided is the front side of the image display apparatus 700.

Figure 15A:
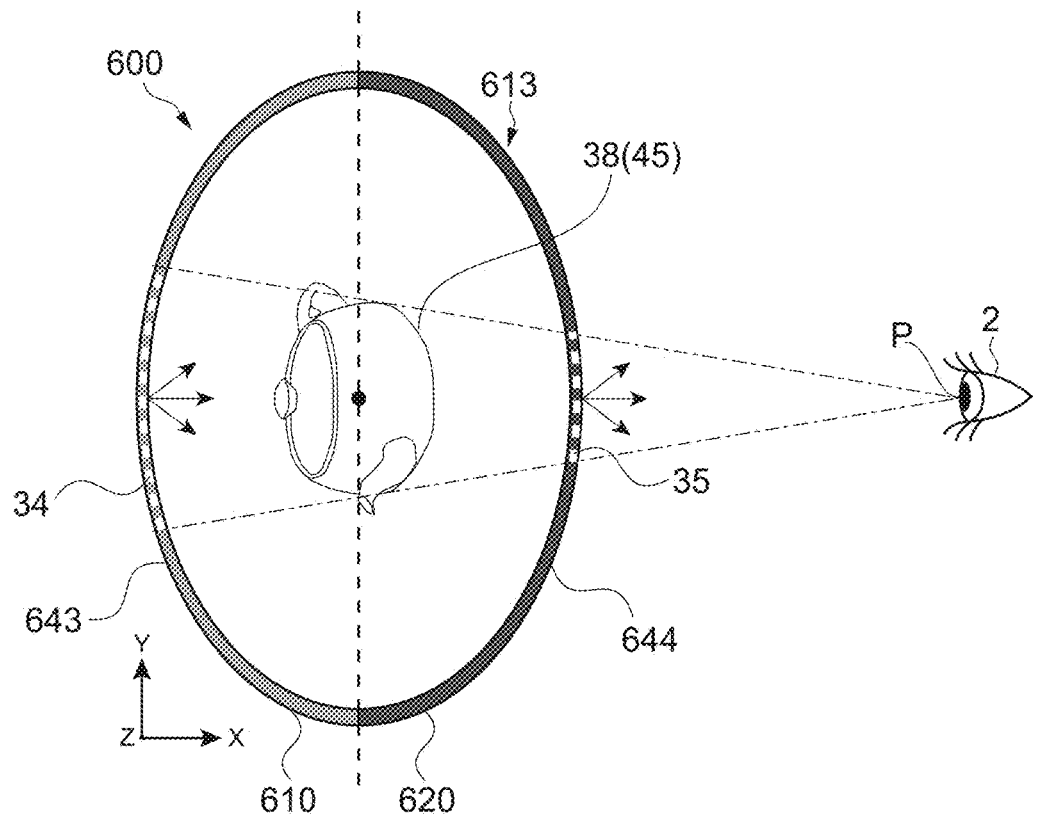
FIGS. 15A and 15B Schematic diagrams showing an example of DFD display in a screen unit shown in FIG. 14.
Figure 15B:
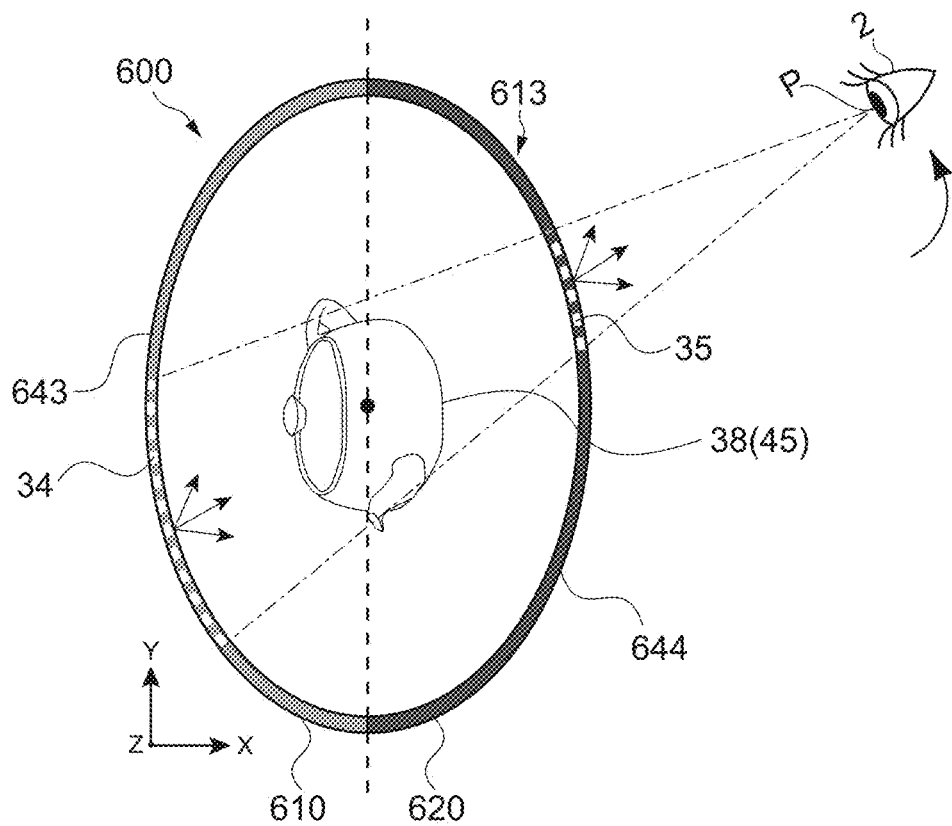

FIGS. 15A and 15B are schematic diagrams showing an example of the DFD display on the screen unit 613 shown in FIG. 14. In each of FIG. 15A and FIG. 15B, a stereoscopic image of a main display object 38 (tea pot) displayed inside the screen unit 613 is schematically shown. It should be noted that in FIG. 15A, the user 2 is viewing the screen unit 613 in the X direction. Moreover, in FIG. 15B, an observation position P of a user 2 is a position obtained by rotating the observation position P of the user 2 from the state shown in FIG. 15A about the reference axis 1.

In the image display apparatus 700, the observation position P of the user 2 is detected. Moreover, a rear image 34 in which the main display object 38 (tea pot) is projected onto the rear screen 643 (reflective screen 610) from the observation position P is generated. Similarly, a rear image 34 in which the main display object 38 is projected onto the front screen 644 (transmissive screen 620) from the observation position P is generated. It should be noted that the rear screen 643 and the front screen 644 are elliptical cylindrical surfaces. Therefore, the sizes and the like of the rear image 34 and the front image 35 are different before and after movement of the observation position P.

Thus, even in a case where the rear screen 643 and the front screen 644 are elliptical cylindrical surfaces, it is possible to properly display the stereoscopic image 45 of the main display object 38 in the center of the screen unit 613 by generating projected images (rear image 34 and front image 35) of the main display object 38 as appropriate. Moreover, a horizontally long image or the like with a sense of depth, for example, can be displayed by using the elliptical cylindrical surface as each screen. As a result, stereoscopic display with a sense of immersion or the like can be realized and image display with a high entertainment value can be realized.

It should be noted that the configuration in which the rear screen 643 and the front screen 644 are elliptical cylindrical surfaces can be applied to the embodiments described above. That is, even in a case of forming the rear screen 643 or the front screen 644 by utilizing the surface reflection, the transparent base material and the like can be configured as appropriate such that each screen is the elliptical cylindrical surface.

Seventh Embodiment

Figure 16:
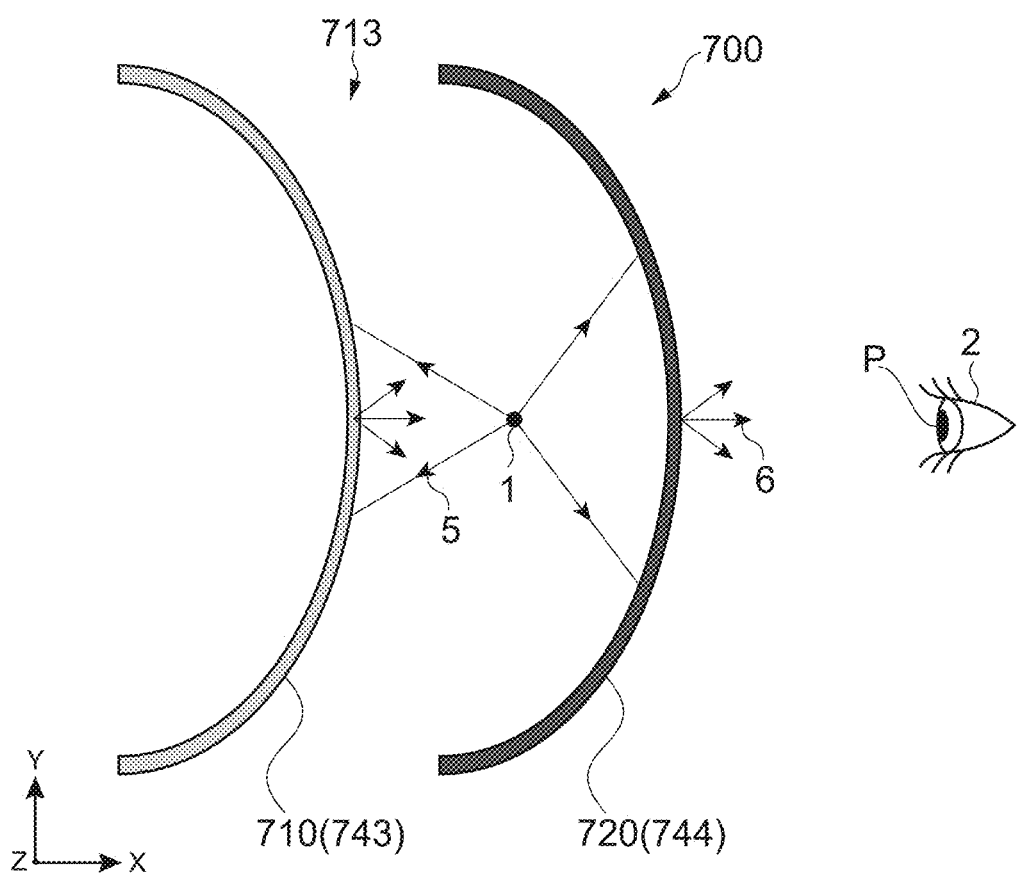
FIG. 16 A cross-sectional view showing a configuration example of an image display apparatus according to a seventh embodiment.

FIG. 16 is a cross-sectional view showing a configuration example of an image display apparatus according to a seventh embodiment. In FIG. 16, a cross section of a screen unit 713 in the XY plane direction as an image display apparatus 700 is viewed from above is schematically shown.

A curved reflective screen 710 is disposed on the rear side of the screen unit 713 and a curved transmissive screen 720 is disposed on the front side. The reflective screen 710 and the transmissive screen 720 both have a convex shape bulging to the front side. It should be noted that in the example shown in FIG. 16, the reflective screen 710 and the transmissive screen 720 are configured to be elliptical cylindrical surfaces. The present technology is not limited thereto, and for example, another curved surface such as a cylindrical surface may be used.

In this embodiment, the reflective screen 710 and the transmissive screen 720 are arranged with a predetermined reference axis 1 interposed therebetween. Moreover, in the image display apparatus 700, image light 5 is projected from surfaces of the reflective screen 710 and the transmissive screen 720, the surfaces being directed to the reference axis 1. Thus, the reflective screen 710 functions as a rear screen 743 and the transmissive screen 720 functions as a front screen 744.

Thus, in the image display apparatus 700, the rear screen 743 and the front screen 744 both have a convex curved shape as viewed from a user 2. Accordingly, each image can be displayed in a state in which the distance between the front image and the rear image is substantially uniform, for example. As a result, for example, an image having a uniform sense of depth over the front surface and the like can be easily displayed.

It should be noted that a configuration in which both the rear screen 743 and the front screen 744 are concave as viewed from the user 2, for example, may be employed. In this case, the user 2 can enjoy stereoscopic display or the like with a high sense of immersion, and image display with a high entertainment value can be realized.

Eighth Embodiment

Figure 17A:
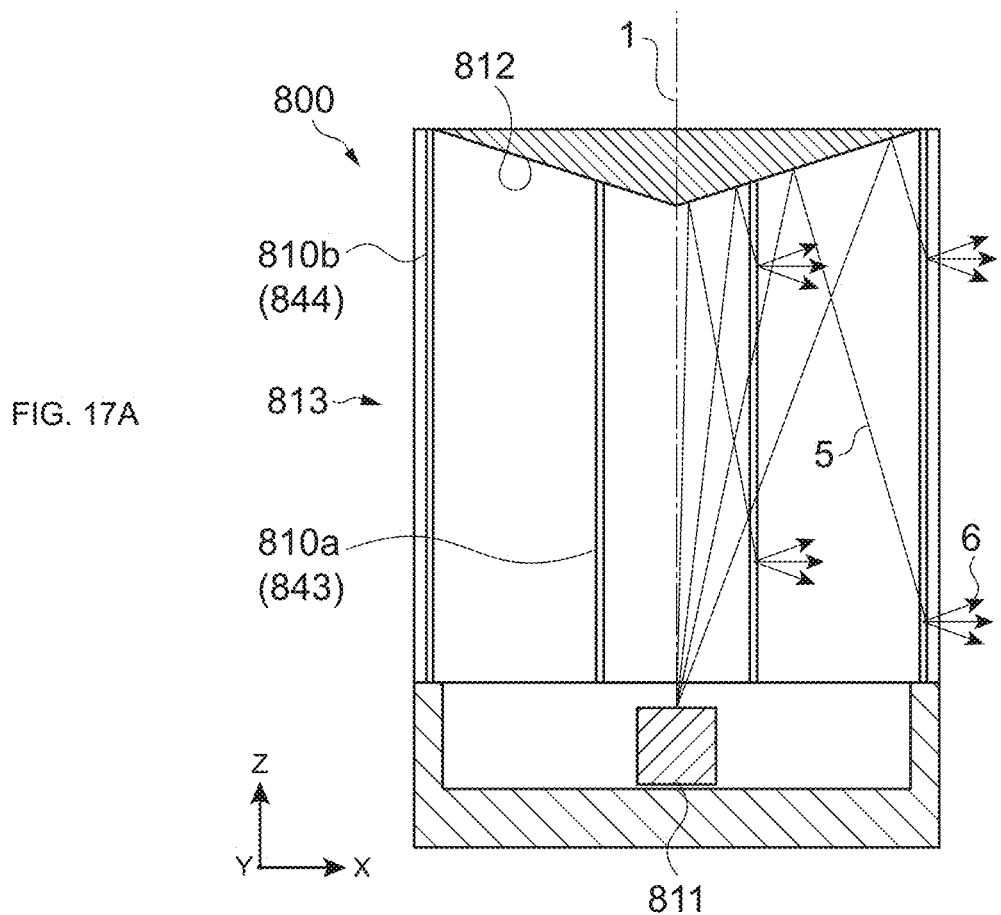
FIGS. 17A and 17B Cross-sectional views showing a configuration example of an image display apparatus according to an eighth embodiment.
Figure 17B:
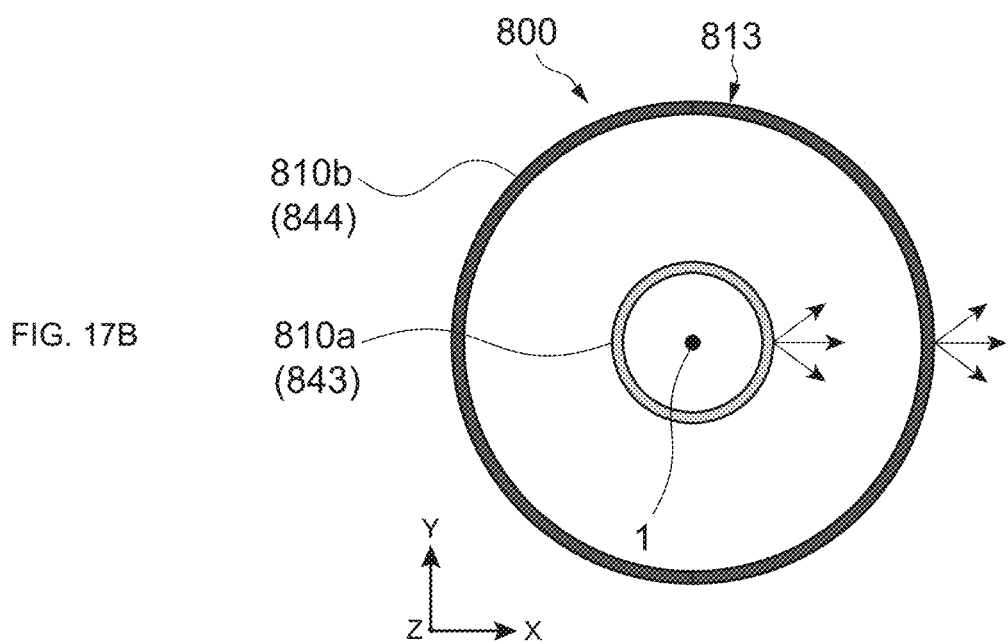

FIGS. 17A and 17B is a are cross-sectional views showing a configuration example of an image display apparatus according to an eighth embodiment. A screen unit 813 of an image display apparatus 800 has an inner cylindrical screen 810a and an outer cylindrical screen 810b having a reference axis 1 as a central axis. The inner cylindrical screen 810a has a smaller radius than the outer cylindrical screen 810b. Therefore, it can also be said that the screen unit 813 is a screen forming a double cylindrical surface.

FIG. 17A shows a cross section obtained by cutting the image display apparatus 800 in the XZ plane direction including the reference axis 1 and FIG. 17B shows a cross section obtained by cutting the screen unit 813 in the XY plane direction. The image display apparatus 800 includes an emitter 811, a reflection mirror 812, and the screen unit 813. The emitter 811 emits image light 5 along the reference axis 1. The reflection mirror 812 is provided on the top surface facing the emitter 811. The image light 5 emitted from the emitter 811 is reflected by the reflection mirror 812 and is projected onto each of the inner cylindrical screen 810a and the outer cylindrical screen 810b.

The inner cylindrical screen 810a and the outer cylindrical screen 810b are both transmissive transparent screens and are configured using a transmissive HOE or the like. As shown in FIG. 17B, the radius of the inner cylindrical screen 810a is set to be smaller than the radius of the outer cylindrical screen 810b. Therefore, a cylindrical space is formed between the inner cylindrical screen 810a and the outer cylindrical screen 810b.

In this manner, the inner cylindrical screen 810a and the outer cylindrical screen 810b are concentrically arranged with a predetermined distance. The distance between the screens and the like are not limited, and may be set as appropriate such that an image with a sense of depth can be properly displayed, for example.

Moreover, the reflection mirror is connected above the inner cylindrical screen 810 and the outer cylindrical screen 810. Accordingly, the reflection mirror 812 can be supported by the two cylindrical surfaces, and the strength of the apparatus can be increased.

As shown in FIG. 17A, the image light 5 reflected by the reflection mirror 812 is projected onto the inside of the inner cylindrical screen 810a. The projected image light 5 is transmitted and diffused by the inner cylindrical screen 810a. Therefore, diffuse light 6 is emitted outward from the inner cylindrical screen 810a. This diffuse light 6 passes through the outer cylindrical screen 810b and is emitted to the outside of the screen unit 813.

Moreover, the image light 5 reflected by the reflection mirror 812 is projected to the inside of the outer cylindrical screen 810b. The projected image light 5 is transmitted and diffused by the outer cylindrical screen 810b. Therefore, the diffuse light 6 is emitted to the outside of the screen unit 813 from the outer cylindrical screen 810b.

For example, the user 2 viewing the screen unit 813 can view a state in which the image displayed on the outer cylindrical screen 810b is superimposed on the front of the image displayed on the inner cylindrical screen 810a. Therefore, in this embodiment, the inner cylindrical screen 810a forms a rear screen 843 and the outer cylindrical screen 810b forms a front screen 844.

Thus, it is possible to display a bright image with a sense of depth over the entire circumference by disposing the two cylindrical transmissive screens overlapping each other. It is also possible to adjust the distance between the two images to be superimposed on each other by setting the radius of the inner cylindrical screen 810a and the like as appropriate, for example. As a result, an image with a desired depth can be easily displayed.

OTHER EMBODIMENTS

The present technology is not limited to the embodiments described above, and various other embodiments can be made.

The configuration in which the image light is projected onto the rear screen and the front screen by the use of the reflection mirror has been described above. The method of projecting the image light onto each screen and the like are not limited. For example, the image light may be projected onto each screen by refracting the image light. For example, a refractive element or the like that controls the traveling direction of the image light by refracting the image light radially emitted from the emitter may be used as appropriate. In this case, the refractive element corresponds to the optical unit.

For example, the refractive element refracts the image light emitted from the emitter, projects the rear image onto the rear screen, and projects the front image onto the front screen. For example, the angle of view of the image light radially emitted is enlarged and projected toward the surrounding screen by the refractive element. Moreover, the traveling direction of the image light may be controlled such that the angle of incidence of the image light to the incident surface is constant. The use of the refractive element makes a configuration without the reflection mirror possible, for example, and an image display apparatus or the like having a transparent top surface can be realized, for example.

For example, an aspherical lens having an aspherical refractive surface, a Fresnel lens having a Fresnel surface, and a refractive element (liquid-crystal lens or the like) having a predetermined refractive index distribution, or the like is used as the refractive element. Alternatively, for example, a refractive lens such as a concave lens and a convex lens, a parallel prism, or the like may be used as the refractive element. Alternatively, a combination of these optical elements may be used. In addition, the specific configuration of the refractive element is not limited.

In the above-mentioned embodiment, the image light is emitted by the use of a single emitter. The present technology is not limited thereto, and for example, the image light may be emitted by the use of a plurality of emitters. For example, the image light 5 is emitted from the plurality of emitters along the reference axis of the cylindrical shape. Alternatively, a configuration in which the plurality of emitters directly projects image light toward the cylindrical screen unit may be employed. For example, the image light is projected to each of the front side and rear side of the screen unit by two emitters (projectors) disposed in a region on the reference axis. Such a configuration is also possible.

In the above description, the observation position P of the user is detected by the use of the detection camera. The present technology is not limited thereto, and an arbitrary sensor capable of detecting the observation position P such as the position of the user and the viewpoint may be used. For example, a sound sensor such as a directional microphone may be used. In this case, the position of the user 2 is detected by detecting the sound. Alternatively, a radar sensor, a distance sensor, an ultrasonic sensor, or the like may be used as appropriate.

It should be noted that the function of detecting the observation position P of the user does not need to be provided. In this case, the detection camera, the detection processing unit, and the like are not provided. Even in such a case, it is possible to view a displayed image with a sense of depth in a wider angle range (azimuth) through the curved rear screen, the curved front screen, and the like.

At least two of the feature parts according to the present technology described above can also be combined. In other words, various feature parts described in each embodiment may be arbitrarily combined across the embodiments. Moreover, the various effects described above are merely illustrative, not limitative, and other effects may be provided.

In the present disclosure, "the same," "equal," "orthogonal," and the like are concepts including "substantially the same," "substantially equal," "substantially orthogonal," and the like. For example, the states included in a predetermined range (e.g., range of ±10%) with reference to "completely the same," "completely equal," "completely orthogonal," and the like are also included.

It should be noted that the present technology can also take the following configurations.

(1) An image display apparatus, including:
a display unit including a curved first screen and a curved second screen, the first screen extending along a predetermined axis, the second screen having transparency and being disposed in front of the first screen with a gap interposed therebetween; and
a projection unit that includes an emitter that emits, from a region on the predetermined axis, light for displaying a first image and a second image which is superimposed on the first image, projects the first image onto the first screen, and projects the second image onto the second screen.

(2) The image display apparatus according to (1), in which
the predetermined axis extends through the gap between the first screen and the second screen, and
the projection unit projects the first image and the second image along an optical path extending through the gap.

(3) The image display apparatus according to (2), in which
the first screen diffuses and reflects light for displaying the first image, and
the second screen diffuses and transmits light for displaying the second image.

(4) The image display apparatus according to (2) or (3), in which
the display unit includes
a substantially tubular transparent base material having a curved cylindrical surface and
a transparent screen that is disposed on either one of an inner surface and an outer surface of the transparent base material.

(5) The image display apparatus according to (4), in which
the transparent screen is a transmissive screen disposed on the inner surface of the transparent base material,
the first screen is formed as the outer surface of the transparent base material, and
the second screen is formed as the transmissive screen.

(6) The image display apparatus according to (4), in which
the transparent screen is a reflective screen disposed on the outer surface of the transparent base material,
the first screen is formed as the reflective screen, and
the second screen is formed as the inner surface of the transparent base material.

(7) The image display apparatus according to (2) or (3), in which
the display unit includes a curved reflective screen and a curved transmissive screen that are disposed with the gap interposed therebetween,
the first screen is formed as the reflective screen, and
the second screen is formed as the transmissive screen.

(8) The image display apparatus according to any one of (1) to (7), in which
the first screen and the second screen are disposed along a circular cylindrical surface having the predetermined axis as a central axis.

(9) The image display apparatus according to any one of (1) to (7), in which
the first screen and the second screen are disposed along an elliptical cylindrical surface having the predetermined axis as a central axis.

(10) The image display apparatus according to any one of (1) to (9), further including
a display control unit that controls display of the first image and the second image.

(11) The image display apparatus according to (10), in which
either one of the first image and the second image is a main image and the other one is a sub-image, and
the display control unit controls a display parameter of the sub-image in accordance with a display state of the main image.

(12) The image display apparatus according to (11), in which
the display parameter includes at least one of luminance, resolution, or saturation of the sub-image.

(13) The image display apparatus according to (11) or (12), in which
the second image is the main image that displays a main display object, and
the first image is the sub-image that displays a sub-display object including at least one of a shadow of the main display object or a background of the main display object.

(14) The image display apparatus according to (13), in which
the display control unit controls at least one of a size or a display speed of the sub-display object such that motion parallax with respect to the main display object is obtained.

(15) The image display apparatus according to any one of (10) to (14), further including
a detector that detects an observation position of an observer, in which
the display control unit controls display of the first image and the second image in accordance with the detected observation position.

(16) The image display apparatus according to (15), in which
the first image and the second image are both images that display a main display object, and
the display control unit generates a projected image of the main display object onto the first screen from the observation position as the first image and generates a projected image of the main display object onto the second screen from the observation position as the second image.

(17) The image display apparatus according to (16), in which
the display control unit acquires depth information of the main display object and controls luminance of the first image and the second image on the basis of the depth information.

(18) The image display apparatus according to any one of (1) to (17), in which
the projection unit includes an optical unit that reflects or refracts the image light emitted from the emitter, projects the first image onto the first screen, and projects the second image onto the second screen.

(19) The image display apparatus according to any one of (1) to (18), in which
the display unit includes a screen using a diffractive optical element.

REFERENCE SIGNS LIST

1 reference axis
P, P1, P2 observation position 2 user
5, 5a, 5b image light
6 diffuse light
11, 811 emitter
12, 812 reflection mirror
13, 213, 313, 413, 513, 613, 713, 813 screen unit
14 detection camera
21 controller
24 detection processing unit
25 display control unit
30, 230, 330, 430 transparent base material
34 rear image
35 front image
36 main image
37 sub-image
40, 240, 340, 540 transparent screen
43, 243, 343, 443, 543, 643, 743, 843 rear screen
44, 244, 344, 444, 544, 644, 744, 844 front screen
100, 200, 300, 400, 500, 600, 700, 800 other image display apparatus

The invention claimed is:

1. An image display apparatus, comprising:
a display unit that includes a first screen and a second screen, wherein
the first screen extends along a specific axis,
the specific axis extends through a gap between the first screen and the second screen, and
the second screen has transparency and is in front of the first screen with the gap therebetween; and
a projection unit that includes an emitter configured to:
emit, from a region on the specific axis, light to display a first image and a second image which is superimposed on the first image;
project the first image onto the first screen along an optical path that extends through the gap; and
project the second image onto the second screen along the optical path, wherein
the first screen is configured to diffuse and reflect the light to display the first image, and
the second screen is configured to diffuse and transmit the light to display the second image.

2. The image display apparatus according to claim 1, wherein the display unit further includes:
a substantially tubular transparent base material having a curved cylindrical surface; and
a transparent screen on one of an inner surface or an outer surface of the transparent base material.

3. The image display apparatus according to claim 2, wherein
the transparent screen is a transmissive screen on the inner surface of the transparent base material,
the first screen corresponds to the outer surface of the transparent base material, and
the second screen corresponds to the transmissive screen.

4. The image display apparatus according to claim 2, wherein
the transparent screen is a reflective screen on the outer surface of the transparent base material,
the first screen corresponds to the reflective screen, and
the second screen corresponds to the inner surface of the transparent base material.

5. The image display apparatus according to claim 1, wherein
the display unit further includes a curved reflective screen and a curved transmissive screen that are disposed with the gap interposed therebetween,
the first screen corresponds to the curved reflective screen, and
the second screen corresponds to the curved transmissive screen.

6. The image display apparatus according to claim 1, wherein the first screen and the second screen are along a circular cylindrical surface having the specific axis as a central axis.

7. The image display apparatus according to claim 1, wherein the first screen and the second screen are along an elliptical cylindrical surface having the specific axis as a central axis.

8. The image display apparatus according to claim 1, further comprising a display control unit configured to control display of the first image and the second image.

9. The image display apparatus according to claim 8, wherein
one of the first image or the second image is a main image and the other one is a sub-image, and
the display control unit is further configured to control a display parameter of the sub-image based on a display state of the main image.

10. The image display apparatus according to claim 9, wherein the display parameter includes at least one of luminance, resolution, or saturation of the sub-image.

11. The image display apparatus according to claim 9, wherein
the second image is the main image that displays a main display object, and
the first image is the sub-image that displays a sub-display object including at least one of a shadow of the main display object or a background of the main display object.

12. The image display apparatus according to claim 11, wherein the display control unit is further configured to control at least one of a size or a display speed of the sub-display object such that motion parallax with respect to the main display object is obtained.

13. The image display apparatus according to claim 8, further comprising a detector configured to detect an observation position of an observer, wherein the display control unit is further configured to control display of the first image and the second image based on the detected observation position.

14. The image display apparatus according to claim 13, wherein
the first image and the second image are both images that display a main display object, and
the display control unit is further configured to:
generate a projected image of the main display object onto the first screen from the observation position as the first image; and
generate a projected image of the main display object onto the second screen from the observation position as the second image.

15. The image display apparatus according to claim 14, wherein the display control unit is further configured to:
acquire depth information of the main display object; and
control luminance of the first image and the second image based on the depth information.

16. The image display apparatus according to claim 1, wherein the projection unit further includes an optical unit configured to:
one of reflect or refract the light emitted from the emitter;
project the first image onto the first screen; and
project the second image onto the second screen.

17. The image display apparatus according to claim 1, wherein
the display unit includes a screen, and
the screen includes a diffractive optical element.

18. An image display apparatus, comprising:
a display unit that includes:
  a first screen and a second screen, wherein
  the first screen extends along a specific axis,
  the specific axis extends through a gap between the first screen and the second screen, and
  the second screen has transparency and is in front of the first screen with the gap therebetween;
  a substantially tubular transparent base material having a curved cylindrical surface; and
  a transparent screen on one of an inner surface and an outer surface of the transparent base material, wherein
  the transparent screen is a transmissive screen on the inner surface of the transparent base material,
  the first screen corresponds to the outer surface of the transparent base material, and
  the second screen corresponds to the transmissive screen; and
a projection unit that includes an emitter configured to:
  emit, from a region on the specific axis, light to display a first image and a second image which is superimposed on the first image;
  project the first image onto the first screen along an optical path that extends through the gap; and
  project the second image onto the second screen along the optical path.

* * * * *